US010663003B2

(12) United States Patent
Kato

(10) Patent No.: US 10,663,003 B2
(45) Date of Patent: May 26, 2020

(54) SEALING APPARATUS

(71) Applicant: NOK CORPORATION, Tokyo (JP)

(72) Inventor: Takuya Kato, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/210,580

(22) Filed: Dec. 5, 2018

(65) Prior Publication Data
US 2019/0107155 A1 Apr. 11, 2019

Related U.S. Application Data

(63) Continuation of application No. PCT/JP2017/017981, filed on May 12, 2017.

(30) Foreign Application Priority Data

Jun. 20, 2016 (JP) .................................. 2016-121751

(51) Int. Cl.
*F16C 33/80* (2006.01)
*F16J 15/32* (2016.01)
(Continued)

(52) U.S. Cl.
CPC .......... *F16C 33/805* (2013.01); *F16C 19/186* (2013.01); *F16C 33/7879* (2013.01);
(Continued)

(58) Field of Classification Search
CPC ................ F16C 2326/02; F16C 33/805; F16C 33/7879; F16C 19/186; F16C 2202/08;
(Continued)

(56) References Cited

U.S. PATENT DOCUMENTS 8,905,641 B2 12/2014 Duch et al.
9,090,122 B2 * 7/2015 Morita .................. F16C 33/805
(Continued)

FOREIGN PATENT DOCUMENTS

CN 103542004 A 1/2014
CN 104329380 A 2/2015
(Continued)

OTHER PUBLICATIONS

English translation of Written Opinion for corresponding International Application No. PCT/JP2017/017981 dated Aug. 1, 2017.
(Continued)

*Primary Examiner* — Alan B Waits
(74) *Attorney, Agent, or Firm* — Pearne & Gordon LLP

(57) ABSTRACT

A sealing apparatus main body includes a reinforcing ring and an elastic material portion which is attached to the reinforcing ring and formed of an elastic material. The elastic material portion has a side lip formed so as to contact a slinger from the inside, a radial lip formed so as to contact the slinger from an outer periphery side, and an outer peripheral annular projection being an annular projection which is arranged on an outer periphery side of the side lip and protrudes to the outside. The slinger has a fitting portion and a flange portion extending from an outer end portion of the fitting portion to the outer periphery side. The elastic material portion forms a labyrinth seal between the outer peripheral annular projection and the side lip between the elastic material portion and the flange portion of the slinger.

9 Claims, 9 Drawing Sheets

(51) Int. Cl.
*F16C 33/78* (2006.01)
*F16J 15/44* (2006.01)
*F16J 15/3232* (2016.01)
*F16C 19/18* (2006.01)
*F16J 15/447* (2006.01)

(52) U.S. Cl.
CPC .......... *F16J 15/3232* (2013.01); *F16J 15/447* (2013.01); *F16J 15/4476* (2013.01); *F16C 2202/08* (2013.01); *F16C 2208/10* (2013.01); *F16C 2326/02* (2013.01)

(58) Field of Classification Search
CPC .. F16C 2208/10; F16J 16/3232; F16J 16/447; F16J 16/4476
See application file for complete search history.

(56) References Cited

U.S. PATENT DOCUMENTS

| | | | | |
|---|---|---|---|---|
| 2007/0278748 | A1* | 12/2007 | Matsui | F16C 33/7896 277/549 |
| 2010/0066029 | A1* | 3/2010 | Kobayashi | F16C 33/7876 277/361 |
| 2013/0241270 | A1* | 9/2013 | Morita | F16C 33/805 301/110 |
| 2014/0037239 | A1 | 2/2014 | Duch et al. | |
| 2015/0003766 | A1 | 1/2015 | Duch et al. | |
| 2015/0110432 | A1* | 4/2015 | Wakisaka | B60B 27/0073 384/486 |
| 2015/0151573 | A1* | 6/2015 | Shibayama | F16J 15/3264 277/351 |
| 2015/0300411 | A1 | 10/2015 | Tomura | |
| 2015/0316151 | A1* | 11/2015 | Suzuki | F16J 15/3256 277/562 |
| 2016/0003302 | A1* | 1/2016 | Seno | F16J 15/3264 277/351 |
| 2016/0114624 | A1* | 4/2016 | Morello | B60B 27/0005 384/480 |
| 2016/0178010 | A1* | 6/2016 | Kaiser | F16C 33/805 277/351 |
| 2016/0186815 | A1* | 6/2016 | Walter | F16C 33/783 277/351 |
| 2017/0198748 | A1* | 7/2017 | Seo | B60B 27/0005 |
| 2017/0198749 | A1* | 7/2017 | Seo | B60B 27/0005 |
| 2017/0335890 | A1* | 11/2017 | Harada | F16C 33/782 |
| 2018/0156277 | A1* | 6/2018 | Yamane | F16J 15/3232 |
| 2018/0156336 | A1* | 6/2018 | Kato | F16J 15/3232 |
| 2018/0186181 | A1* | 7/2018 | Tada | F16J 15/447 |
| 2018/0195558 | A1* | 7/2018 | Kato | F16C 33/7879 |

FOREIGN PATENT DOCUMENTS

| | | |
|---|---|---|
| CN | 104718389 A | 6/2015 |
| CN | 107949712 A | 4/2018 |
| EP | 2 685 118 A1 | 1/2014 |
| EP | 3 339 693 A1 | 6/2018 |
| FR | 3 018 321 A1 | 9/2015 |
| JP | 07-034225 U | 6/1995 |
| JP | 2008-157327 A | 7/2008 |
| JP | 2010-025253 A | 2/2010 |
| JP | 2012-097817 A | 5/2012 |
| JP | 2015-052350 A | 3/2015 |
| JP | 2015-209957 A | 11/2015 |
| JP | 2015-212561 A | 11/2015 |
| JP | 3201207 U | 11/2015 |
| JP | 2016-080141 A | 5/2016 |
| WO | 2012/060354 A1 | 5/2012 |

OTHER PUBLICATIONS

International Preliminary Report on Patentability for corresponding International Application No. PCT/JP2017/017981 dated Dec. 25, 2018.
International Search Report for corresponding International Application No. PCT/JP2017/017981 dated Aug. 1, 2017.
Written Opinion for corresponding International Application No. PCT/JP2017/017981 dated Aug. 1, 2017.
Chinese Office Action dated Nov. 4, 2019 for corresponding Chinese Application No. 201780037206.3 and English translation.
Extended European Search Report dated Nov. 26, 2019 for corresponding European Application No. 17815052.0.

* cited by examiner

SEALING APPARATUS

CROSS REFERENCE TO RELATED APPLICATIONS

The present application is a continuation application of International Application No. PCT/JP2017/017981, filed on May 12, 2017, which claims priority to Japanese Patent Application No. 2016-121751, filed on Jun. 20, 2016. The contents of these applications are incorporated herein by reference in their entirety.

BACKGROUND

Technical Field

The present disclosure relates to a sealing apparatus, and particularly relates to a sealing apparatus for sealing the space between an annular outer periphery side member and an annular inner periphery side member, which are rotatable relatively to each other about an axis.

BACKGROUND

With respect to a vehicle such as an automobile, a hub bearing for rotatably supporting a wheel is placed in an environment where it is directly exposed to foreign matter such as rainwater, muddy water and dust. Therefore, conventionally, a sealing apparatus for sealing an internal space formed between an outer ring and a hub which are rotatable relatively to each other about an axis is attached to the hub bearing. In this sealing apparatus, a radial lip which is attached to the outer ring and extends to the axis is brought into sliding contact with a hub, and a side lip extending in the axis direction is brought into sliding contact with the hub, thereby sealing lubricant for a rolling element arranged in an inner space of the hub bearing and also preventing foreign matter from intruding into the internal space. Some conventional sealing apparatuses are provided with plural side lips in order to enhance the sealing performance of the internal space to foreign matter (for example, see Japanese Utility Model Registration No. 3201207).

SUMMARY

Due to diversification of operating environments of vehicles, higher sealing performance has been required of sealing apparatuses in order to prevent intrusion of foreign matter, even in an operating environment which is more harsh with respect to prevention of intrusion of foreign matter. Furthermore, it has been required in a relatively rotating device such as a hub bearing to reduce rotational torque of the hub bearing for the purpose of reducing fuel consumption. For the enhancement of the sealing performance of the sealing apparatus, a measure for increasing the number of side lips is conceivable. However, when the number of side lips is increased, the sliding resistance between the sealing apparatus and the hub increases, and the rotational torque for rotating the hub increases, so that the rotational torque of the hub bearing increases.

As described above, the conventional sealing apparatus has been required to have a structure capable of enhancing the sealing performance to foreign matter while avoiding an increase in the sliding resistance between the sealing apparatus and the hub bearing.

The present disclosure has been made in view of the above problems, and an object of the present disclosure is to provide a sealing apparatus capable of enhancing the sealing performance to foreign matter while avoiding an increase in sliding resistance between the sealing apparatus and an applied target.

In order to attain the above object, a sealing apparatus according to the present disclosure is a sealing apparatus for sealing a space between an outer periphery side member and an inner periphery side member which is at least partially enclosed by the outer periphery side member, the outer periphery side member and the inner periphery side member being rotatable relatively to each other with respect to an axis, the sealing apparatus being characterized by including: a sealing apparatus main body attached to the outer periphery side member; and an opposing portion having an annular shape around the axis that is provided on the inner periphery side member on one side in a direction of the axis of the sealing apparatus main body, wherein the sealing apparatus main body includes a reinforcing ring having an annular shape around the axis, and an elastic material portion having an annular shape around the axis which is attached to the reinforcing ring and formed of an elastic material, the elastic material portion includes a side lip formed so as to contact the opposing portion from the other side in the direction of the axis, a radial lip formed so as to contact the opposing portion from an outer periphery side, and an outer peripheral annular projection being a projection having an annular shape around the axis that is arranged on an outer periphery side of the side lip, and protrudes to one side in the direction of the axis, the outer peripheral annular projection is formed so as to form a gap between the outer peripheral annular projection and the opposing portion at a tip on one side in the direction of the axis, the opposing portion has an annular flange surface extending in a peripheral direction with respect to the axis, and the flange surface of the opposing portion and the elastic material portion of the sealing apparatus main body are formed so as to form a labyrinth seal between the outer peripheral annular projection and the side lip.

In the sealing apparatus according to an aspect of the present disclosure, the elastic material portion includes an elastic material portion ridge portion between the outer peripheral annular projection and the side lip, the elastic material portion ridge portion being a portion having an annular shape around the axis which projects to one side in the direction of the axis, wherein the elastic material portion ridge portion has an inner labyrinth seal face which is an annular surface facing one side in a direction of the axis, the inner labyrinth seal face is formed so as to face the flange surface of the opposing portion via a gap in the direction of the axis, and the inner labyrinth seal face and the flange surface of the opposing portion form the labyrinth seal.

In the sealing apparatus according to an aspect of the present disclosure, the inner labyrinth seal face has at least one annular step portion forming a step in the direction of the axis, and a portion on an outer periphery side of the inner labyrinth seal face is positioned on one side in the direction of the axis.

In the sealing apparatus according to an aspect of the present disclosure, the opposing portion has an opposing portion ridge portion on the flange surface, the opposing portion ridge portion being a portion having an annular shape around the axis which protrudes to the other side, the opposing portion ridge portion has an outer labyrinth seal face which is an annular surface facing the other side, the outer labyrinth seal face is formed so as to face the elastic material portion of the sealing apparatus main body via a gap in the direction of the axis, and the outer labyrinth sealing face and the elastic material portion of the sealing apparatus main body form the labyrinth seal.

In the sealing apparatus according to an aspect of the present disclosure, an inner labyrinth seal face being a portion of the elastic material portion that faces the outer labyrinth seal face in the direction of the axis has at least one annular step portion forming a step in the direction of the axis, and a portion on an outer periphery side of the inner labyrinth seal face is positioned on one side in the direction of the axis.

The sealing apparatus according to an aspect of the present disclosure further comprises a slinger having an annular shape around the axis as the opposing portion that is attached to the inner periphery side member on one side in the direction of the axis of the sealing apparatus main body, wherein the slinger has a fitting portion that extends in the direction of the axis in an annular shape around the axis, and an annular flange portion that extends from an end portion on one side in the direction of the axis of the fitting portion to the outer periphery side, and forms the flange surface.

In the sealing apparatus according to an aspect of the present disclosure, the opposing portion is formed in the inner periphery side member.

In the sealing apparatus according to an aspect of the present disclosure, the elastic material portion has a dam portion being an annular portion which is located on an outer periphery side of the outer peripheral annular projection and protrudes to the outer periphery side, and the dam portion is formed so as to protrude to the outer periphery side beyond a portion of the outer periphery side member which contacts the sealing apparatus main body in the direction of the axis.

According to a sealing apparatus of the present disclosure, it is possible to enhance the sealing performance to foreign matter while avoiding increase of sliding resistance between the sealing apparatus and a target to be applied.

DETAILED DESCRIPTION

Hereinafter, embodiments of the present disclosure will be described with reference to the drawings.

Figure 1:
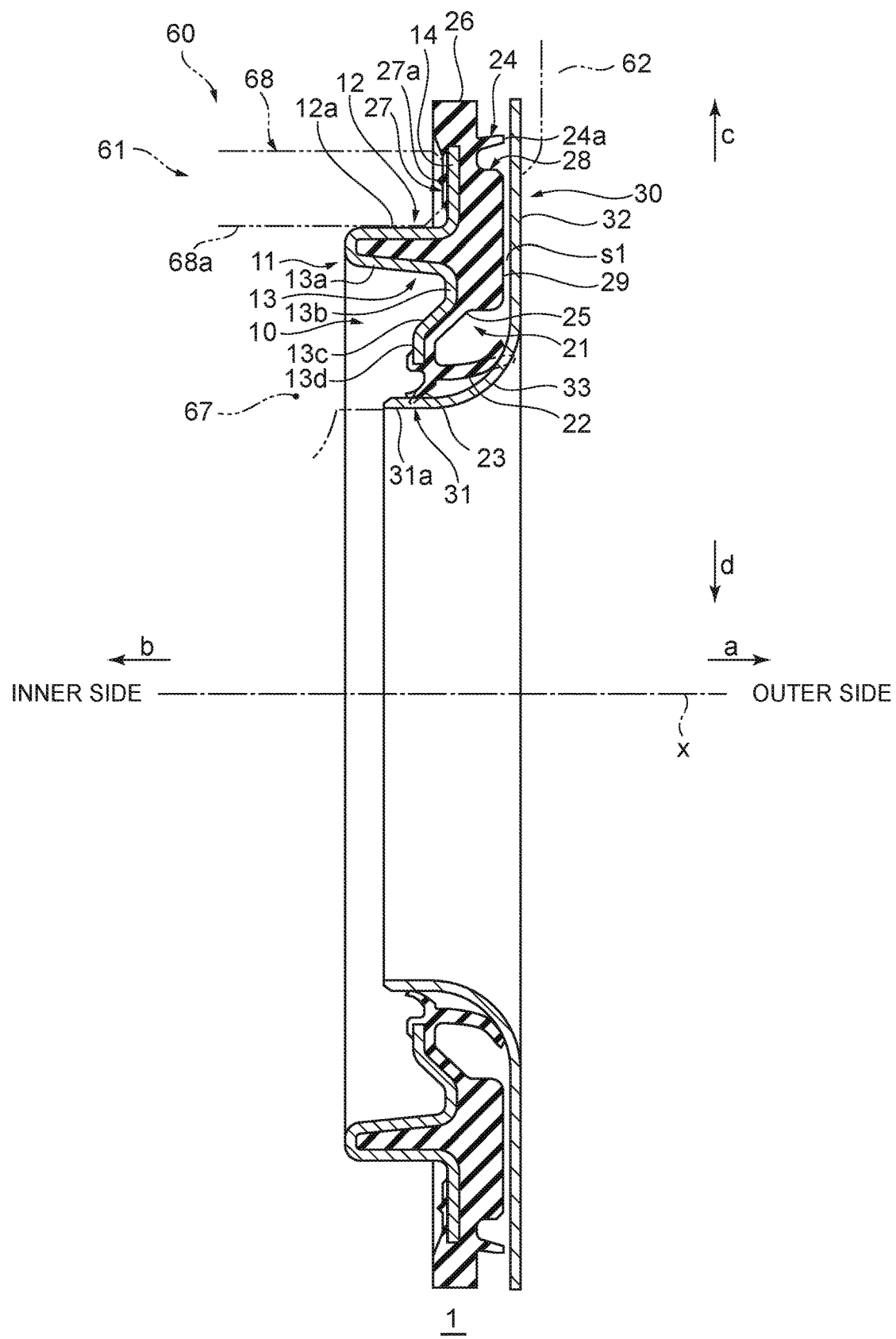
FIG. 1 is a cross-sectional view in a cross-section taken along an axis to show a schematic configuration of a sealing apparatus according to a first embodiment of the present disclosure.

FIG. 1 is a cross-sectional view in a cross-section taken along an axis to show a schematic configuration of a sealing apparatus 1 according to a first embodiment of the present disclosure. The sealing apparatus according to the present disclosure is a sealing apparatus for sealing the space between an outer periphery side member and an inner periphery side member surrounded at least partially by the outer periphery member, the outer periphery side member and the inner periphery side member being rotatable relatively to each other about the axis, and the sealing apparatus 1 is used to seal the space between an outer ring 61 and a hub 62 in the hub bearing 60 as described later.

For convenience of description, the direction of an arrow a (see FIG. 1) in an axis x direction (one side in the axis direction) is referred to as "outside", and the direction of an arrow b (see FIG. 1) in the axis x direction (another side in the axis direction) is referred to as "inside". More specifically, outside means a direction leaving the space between the outer ring and the hub as a sealing target space, and inside means a direction approaching the sealing target space. Furthermore, in a direction perpendicular to the axis x (hereinafter also referred to as "radial direction"), a direction leaving the axis x (the direction of an arrow c in FIG. 1) is referred to as an outer periphery side and a direction approaching the axis x (the direction of an arrow d in FIG. 1) is referred to as an inner periphery side.

The sealing apparatus 1 includes a sealing apparatus main body 10 attached to an outer ring serving as an outer periphery side member, and a slinger 30 serving as an opposing portion having an annular shape around an axis x which is attached to a hub serving as an inner periphery side member on one side (outside) in an axis x direction of the sealing apparatus main body 10.

As shown in FIG. 1, the sealing apparatus main body 10 includes a reinforcing ring 11 having an annular shape around an axis x, and an elastic material portion 21 which is attached to the reinforcing ring 11 and formed of an elastic material and has an annular shape about the axis x. The elastic material portion 21 includes a side lip 22 which is formed so as to contact the slinger 30 from the other side (inside) in the axis x direction, a radial lip 23 which is formed so as to contact the slinger 30 from the outer periphery side, and an outer peripheral annular projection 24 which is arranged on an outer periphery side of the side lip 22 and is an projection which projects to the outside and is in an annular shape around the axis x. The outer peripheral annular projection 24 is formed so as to form a gap with the slinger 30 at an outer end 24a which is a distal end on the outside.

Specifically, the reinforcing ring 11 is a metallic member in an annular shape centered or substantially centered about the axis x, and formed so as to be press-fitted into a through-hole 67 of the outer ring 61. The reinforcing ring 11 is press-fitted into the outer ring 61, whereby the sealing apparatus main body 10 is fixed to the outer ring 61. For example, as shown in FIG. 1, the reinforcing ring 11 includes a cylindrical fitting portion 12 positioned on the outer periphery side, a position adjusting portion 13 extending from an inner end portion of the fitting portion 12 to the inner periphery side, and a disc-like flange portion 14 extending from an outer end portion of the fitting portion 12 to the outer periphery side.

The fitting portion 12 is a portion in a cylindrical or substantially cylindrical shape centered or substantially centered about the axis x, and is formed so that an outer peripheral surface 12a which is a peripheral surface on the outer periphery side is closely engagedly fitted to an inner peripheral surface 68a of an outer opening portion 68 which is a portion of the outer ring 61 at which the through-hole 67 is opened on the outside. The position adjusting portion 13 is shaped so that the side lip 22 and the radial lip 23 are arranged at desired positions in the sealing apparatus 1, and includes a return portion 13a which is a substantially conical tubular or substantially cylindrical portion returning from the inner end portion of the fitting portion 12 to the outside, a connection flange portion 13b which is a disc-like portion extending from the outer end portion of the return portion 13a to the inner periphery side, a substantially conical tubular return portion 13c which obliquely extends from an end portion on the inner periphery side of the connection flange portion 13b to the inside and the inner periphery side, and a seal flange portion 13d which is a disc-like portion extending from an end portion on the inner periphery side of the return portion 13c to the inner periphery side. The flange portion 14 is a portion which is in a hollow disc-like shape or a substantially hollow disc-like shape centered or substantially centered about the axis x and expands in a radial direction. The reinforcing ring 11 is formed as an integral member from a metal plate by press-working or forging, and both the fitting portion 12 and the position adjusting portion 13, and both the fitting portion 12 and the flange portion 14 are respectively integrally continuous with each other, and joined to each other. The metal material of the reinforcing ring 11 includes, for example, stainless steel or SPCC (cold rolled steel).

The elastic material portion 21 is attached to the reinforcing ring 11, and is integrally formed with the reinforcing ring 11 so as to cover the reinforcing ring 11 from the outside as shown in FIG. 1. The elastic material portion 21 has a base portion 25, and each of the side lip 22 and the radial lip 23 extends from an end portion on the inner periphery side of the base portion 25. The base portion 25 is a portion of the elastic material portion 21 which spreads on the outer surface of the reinforcing ring 11 across the flange portion 14, the fitting portion 12, and the position adjusting portion 13 of the reinforcing ring 11, and the elastic material portion 21 is integrally attached to the reinforcing ring 11 at the base portion 25.

The side lip 22 extends to the outside from the base portion 25 in an annular shape centered or substantially centered about the axis x, and is formed so that a tip portion thereof contacts a later-described transition portion 33 of the slinger 30 with a predetermined interference under a usage state of the sealing apparatus 1 described later in which the sealing apparatus main body 10 and the slinger 30 are attached at desired positions in the hub bearing 60. The side lip 22 has, for example, a conical tubular shape which increases in diameter as shifting to the outside in the axis x direction.

The radial lip 23 extends from the base portion 25 to the inside and the inner periphery side in an annular shape centered or substantially centered about the axis x. The radial lip 23 is formed so that the tip end thereof contacts a later-described fitting portion 31 of the slinger 30 with a predetermined interference in the usage state of the sealing apparatus 1.

The outer peripheral annular projection 24 protrudes to the outside from the end portion on the outer periphery side of the base portion 25, and extends so as to be centered or substantially centered about the axis. As shown in FIG. 1, the outer peripheral annular projection 24 obliquely protrudes from the base portion 25 to the outside and the outer periphery side.

Furthermore, the elastic material portion 21 has a dam portion 26 which is an annular portion protruding to the outer periphery side and is provided on the outer periphery side of the outer peripheral annular projection 24. As described later, the dam portion 26 is formed so as to protrude to the outer periphery side of an outer end face 68b which is a portion contacting the sealing apparatus main body 10 in the axis x direction of the outer ring 61 in a state where the sealing apparatus main body 10 is attached to the outer ring 61. For example, as shown in FIG. 1, the dam portion 26 is formed so as to cover an end portion on the outer periphery side of the flange portion 14 of the reinforcing ring 11 on the outer periphery side and the inner periphery side.

As shown in FIG. 1, the elastic material portion 21 also has a gasket portion 27 which at least partially covers the inner surface of the flange portion 14 of the reinforcing ring 11. The gasket portion 27 spreads in an annular shape around the axis x, and continues to an end portion on the inner periphery side of the dam portion 26.

Specifically, as shown in FIG. 1, the slinger 30 as the opposing portion includes the fitting portion 31 which is a portion extending in the axis x direction in an annular shape around the axis x, and a flange portion 32 which is an annular portion extending from the outer end portion of the fitting portion 31 to the outer periphery side. The flange portion 32 forms a flange surface. The fitting portion 31 is a portion in a cylindrical or substantially cylindrical shape centered or substantially centered about the axis x, and is formed to be closely engagedly fitted to the hub 62 described later on an inner peripheral surface 31a which is a peripheral surface on the inner periphery side. The flange portion 32 is a portion which expands in the radial direction and is in a hollow disc-like shape or hollow substantially disc-like shape centered or substantially centered about the axis x. Furthermore, the slinger 30 has the transition portion 33 which is an annular portion for connecting the fitting portion 31 and the flange portion 32. As shown in FIG. 1, the shape of a cross-section along the axis x (hereinafter referred to as also simply referred to as "cross-section") of the transition portion 33 is a curved shape, and the transition portion 33 smoothly connects an outer end portion of the fitting portion 31 and an end portion on the inner periphery side of the flange portion 32.

The slinger 30 is formed as an integral member from a metal plate by press-working or forging, and both the fitting portion 31 and the transition portion 33, and both the fitting portion 31 and the flange portion 32 are integrally continuous with each other, and joined to each other. The metal material of the slinger 30 include stainless steel or SPCC (cold rolled steel).

Furthermore, the elastic material portion 21 forms a labyrinth seal between the outer peripheral annular projection 24 and the side lip 22 in the axis x direction between the elastic material portion 21 and the flange portion 32 of the slinger 30. Specifically, as shown in FIG. 1, the elastic material portion 21 has an elastic material portion ridge portion 28 between the outer peripheral annular projection 24 and the side lip 22, the elastic material portion ridge portion 28 being a portion which projects to the outside and has an annular shape around the axis x, and the elastic material portion ridge portion 28 has an inner labyrinth seal face 29 which is an annular surface facing the outside. The inner labyrinth seal face 29 is formed so as to face the flange portion 32 of the slinger 30 via a gap in the axis x direction, and the inner labyrinth seal face 29 and the flange portion 32 of the slinger 30 form a labyrinth seal s1. The inner labyrinth seal face 29 and the flange portion 32 of the slinger 30 form the labyrinth seal s1 under the usage state of the sealing apparatus 1. Details of the labyrinth seal s1 will be described later.

Specifically, as shown in FIG. 1, the elastic material portion ridge portion 28 is a portion which protrudes from the base portion 25 to the outside in an annular band-like shape between the side lip 22 and the outer peripheral annular projection 24. The inner labyrinth seal face 29 which is a surface facing the outside of the elastic material portion ridge portion 28 is a flat surface, and spreads on a plane orthogonal or substantially orthogonal to the axis x. The inner labyrinth seal face 29 may not be a flat surface, but may be a substantially flat surface, a surface having distortion, or a curved surface in an area where it forms the labyrinth seal s1. The inner labyrinth seal face 29 is located at the same position in the axis x direction as an outer end 24a which is the tip of the outer peripheral annular projection 24, for example.

The elastic material portion 21 is integrally attached to the reinforcing ring 11, and the side lip 22, the radial lip 23, the outer peripheral annular projection 24, the base portion 25, the dam portion 26, the gasket portion 27, and the elastic material portion ridge portion 28 described above are portions of the elastic material portion 21 which are formed as an integral member, and are integrally continuous with one another. For example, various kinds of rubber materials are used as the elastic material of the elastic material portion 21. The various kinds of rubber materials include synthetic rubber such as nitrile rubber (NBR), hydrogenated nitrile rubber (H-NBR), acrylic rubber (ACM), and fluorine rubber (FKM).

Figure 2:
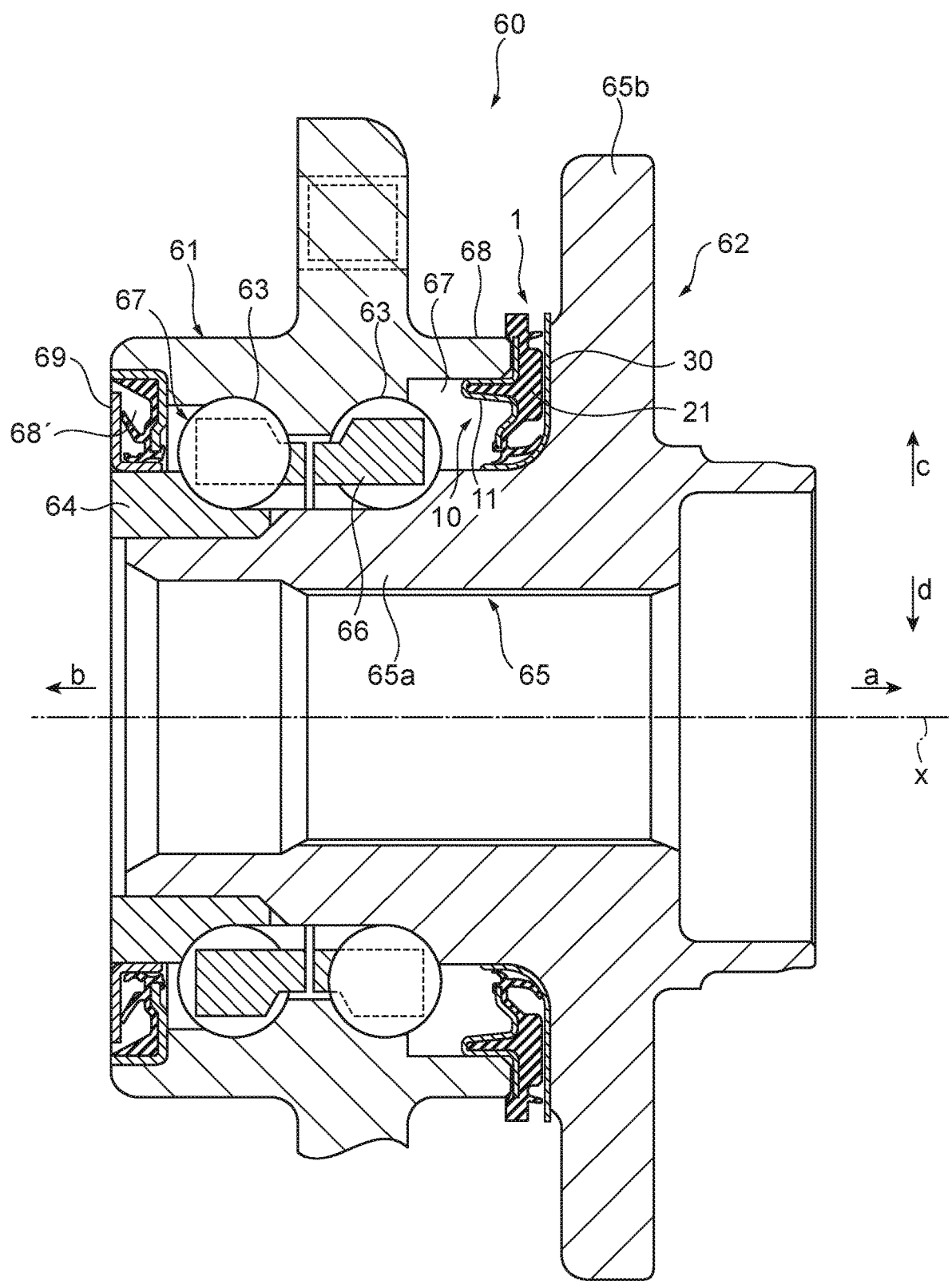
FIG. 2 is a cross-sectional view of a hub bearing in a cross-section taken along an axis x to show a usage state of the sealing apparatus shown in FIG. 1 attached to a hub bearing.
Figure 3:
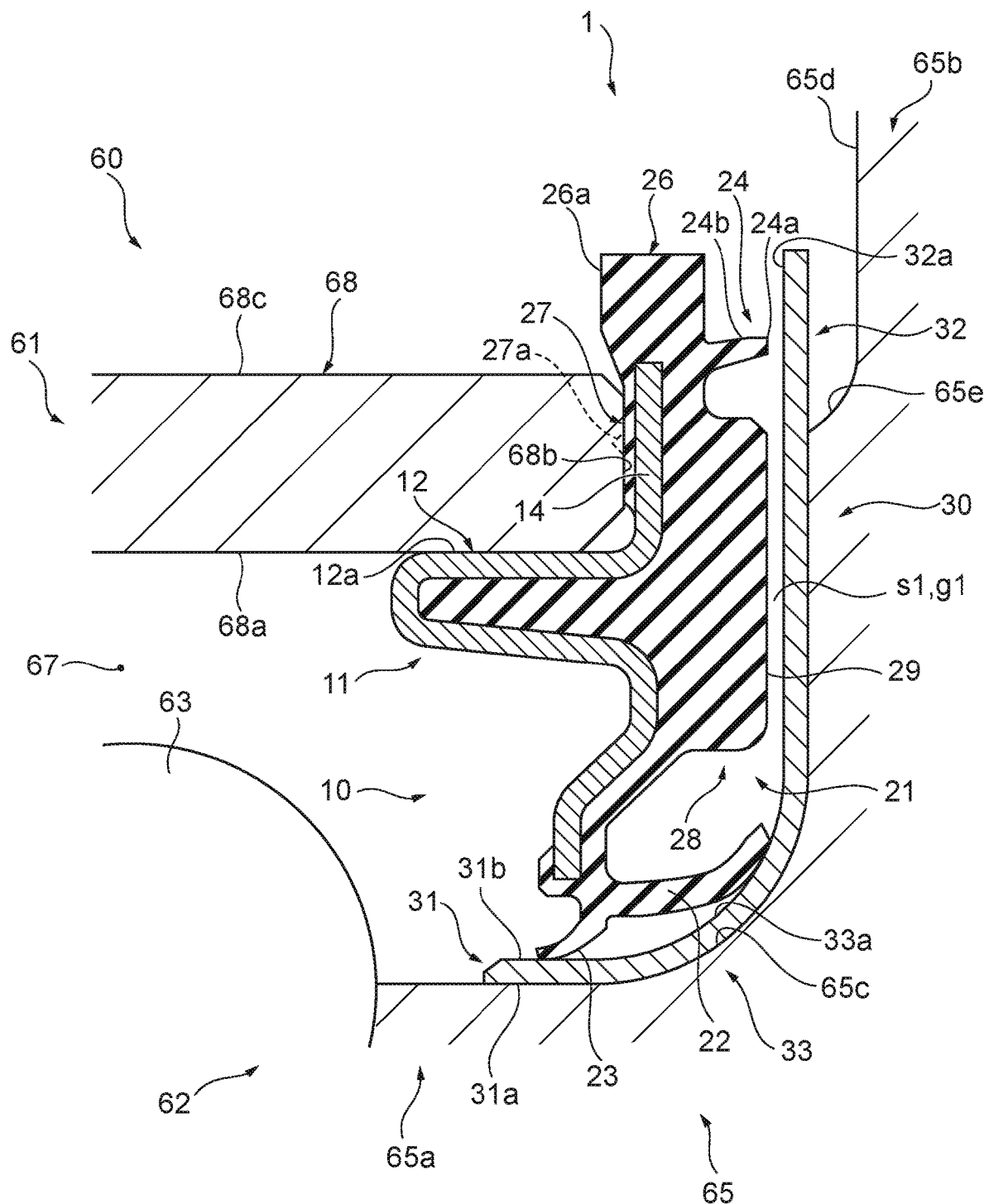
FIG. 3 is a partially enlarged cross-sectional view of the hub bearing in FIG. 2 in the vicinity of the sealing apparatus.

Next, the usage state of the sealing apparatus 1 will be described. FIG. 2 is a cross-sectional view of the hub bearing 60 on a cross-section taken along the axis x to show the usage state of the sealing apparatus 1 attached to the hub bearing 60, and FIG. 3 is a partially enlarged cross-sectional view of the vicinity of the sealing apparatus 1 of FIG. 2. As shown in FIG. 2, the hub bearing 60 is a conventionally known hub bearing, and is provided in a vehicle or the like to support a wheel in an axle or a suspension device so that the wheel is freely rotatable. Specifically, as shown in FIG. 2, the hub bearing 60 includes the outer ring 61 as an outer periphery side member in an annular shape centered or substantially centered about the axis x, the hub 62 as an inner periphery side member in an annular shape centered or substantially centered about the axis x which is rotatable relatively to the outer ring 61 and partially enclosed by the outer ring 61, and plural bearing balls 63 arranged between the outer ring 61 and the hub 62. Under a usage state of the hub bearing 60 attached to a vehicle or the like, the outer ring 61 is fixed and the hub 62 is allowed to rotate relative to the outer ring 61. Specifically, the hub 62 includes an inner ring 64 and a hub ring 65, and the hub ring 65 has a tubular or substantially cylindrical shaft portion 65a extending along the axis x, and a wheel mounting flange 65b. The wheel mounting flange 65b is a portion which spreads in a disc-like shape from one end of the shaft portion 65a (an outer end portion in the hub bearing 60) to the outer periphery side, and to which a wheel (not shown) is attached by plural hub bolts. The shaft portion 65a and the wheel mounting flange 65b are smoothly connected to each other on the inside, and a transition portion 65c which is a portion in which the shaft portion 65a and the wheel mounting flange 65b are connected to each other has an outline which draws a circular-arc-shaped or arc-shaped smooth curve line on a cross-section along the axis x. The inner ring 64 is fitted to an end portion on the inside (a side in the direction of an arrow b) of the shaft portion 65a of the hub ring 65 so as to hold the bearing balls 63 in the space between the outer ring 61 and the inner ring 64. The bearing balls 63 are held by a retainer 66 in the space between the outer ring 61 and the hub 62.

The outer ring 61 has a through-hole 67 extending in the axis x direction, the shaft portion 65a of the hub ring 65 of the hub 62 is inserted in the through-hole 67, and an annular space extending along the axis x is formed between the shaft portion 65a and the through-hole 67. As described above, the bearing balls 63 are accommodated in this space and held by the retainer 66, and lubricant is coated or poured. The sealing apparatus main body 10 is attached to the outer opening portion 68 of the outer ring 61 forming an opening through which the space between the shaft portion 65a and the through-hole 67 is opened on the outside (a side in the direction of the arrow a), and another sealing apparatus 69 is attached to an inner opening portion 68' of the outer ring 61 forming an opening through which the space between the shaft portion 65a and the through-hole 67 is opened on the inside (a side in the direction of an arrow b). The space between the shaft portion 65a and the inner ring 64 and the through-hole 67 is sealed by the sealing apparatuses 1 and 69, and the internal lubricant is prevented from leaking to the outside, and foreign matter is prevented from intruding from the outside into the inside. The sealing apparatus 69 is a conventionally known sealing apparatus, and a detailed description thereof will be omitted. Furthermore, the sealing apparatus 1 is applicable as the sealing apparatus 69. In this case, the slinger 30 is deformed so as to conform to the shape of the inner ring 64, and, in the hub bearing 60, outside corresponds to the direction of the arrow b, and inside corresponds to the direction of the arrow a. The configuration of the hub bearing to which the sealing apparatus 1 is applied is not limited to the above-described configuration of the hub bearing 60.

As shown in FIG. 3, the sealing apparatus 1 is attached in the vicinity of the outer opening portion 68 of the outer ring 61 and the transition portion 65c of the hub ring 65. Specifically, the sealing apparatus main body 10 is attached to the outer opening portion 68 of the outer ring 61, and the slinger 30 is attached in the vicinity of the transition portion 65c of the hub ring 65.

The fitting portion 12 of the reinforcing ring 11 is press-fitted into and engagedly fitted to the outer opening portion 68 of the outer ring 61, whereby the sealing apparatus main body 10 is fixed to the outer ring 61. The outer peripheral surface 12a of the fitting portion 12 of the reinforcing ring 11 is in close contact with the inner peripheral surface 68a facing the inner peripheral direction of the outer opening portion 68 of the outer ring 61, thereby performing the sealing between the reinforcing ring 11 and the outer ring 61.

Furthermore, under the usage state, as shown in FIG. 3, the reinforcing ring 11 is attached to the outer ring 61 so that the flange portion 14 thereof presses the inwardly-spreading gasket portion 27 of the elastic material portion 21 against the outer end face 68b forming an annular surface which faces the outside of the outer opening portion 68. As a result, the gasket portion 27 is compressed between the outer end face 68b and the flange portion 14, whereby the sealing between the outer ring 61 and the sealing apparatus main body 10 at the outer end face 68b can be enhanced. It is preferable that a bead 27a which is an annular projection protruding to the inside is formed in the gasket portion 27 as shown in FIGS. 1 and 3. The bead 27a is pressed against the outer end face 68b of the outer opening portion 68 under the usage state, whereby the sealing between the outer ring 61 and the sealing apparatus main body 10 at the outer end face 68b can be further enhanced. The gasket portion 27 may not have the bead 27a.

As shown in FIG. 3, the shaft portion 65a of the hub ring 65 is press-fitted into and engagedly fitted to the fitting portion 31, whereby the slinger 30 is fixed to the hub ring 65. The inner peripheral surface 31a of the fitting portion 31 is in close contact with the shaft portion 65a of the hub ring 65. The transition portion 33 of the slinger 30 is formed so as to have a shape following the shape of the transition portion 65c of the hub ring 65, and under the usage state, the flange portion 32 of the slinger 30 is in contact with an inner surface 65d which is an inner surface of the wheel mounting flange 65b of the hub ring 65. Under the usage state, the transition portion 33 of the slinger 30 may contact the surface of the transition portion 65c of the hub ring 65, or may form a space with the transition portion 65c.

Under the usage state, as shown in FIG. 3, the inner labyrinth seal face 29 of the elastic material portion ridge portion 28 faces, in the axis x direction, an inner surface 32a as a flange surface which is a surface facing the inside of the flange portion 32 of the slinger 30, and forms an annular gap g1 between the inner surface 32a of the flange portion 32 and the inner labyrinth seal face 29. The width of the gap g1 in the axis x direction is narrow, and the gap g1 forms the labyrinth seal s1. Therefore, even when foreign matter such as muddy water, sand, dust or the like intrudes from the outside of the hub bearing 60, the intruding foreign matter can be prevented from further intruding to the side lip 22 side by the labyrinth seal s1 (gap g1) formed by the inner labyrinth seal face 29 of the elastic material portion ridge portion 28 and the flange portion 32 of the slinger 30. As described above, since the elastic material portion ridge portion 28 forms the labyrinth seal s1 between the elastic material portion ridge portion 28 and the slinger 30 without contacting the slinger 30, the sealing performance with respect to the foreign matter can be enhanced while avoiding an increase in sliding resistance of the sealing apparatus main body 10 to the slinger 30. Since increase of the sliding resistance of the sealing apparatus main body 10 to the slinger 30 can be avoided, increase of the sliding resistance to the hub bearing 60 can also be avoided.

Furthermore, since the inner labyrinth seal face 29 extends between the side lip 22 and the outer peripheral annular projection 24, and can be configured to have a large width in the radial direction, the width in the radial direction of the labyrinth seal s1 can be increased, and thus the sealing performance of the labyrinth seal s1 can be enhanced. It is preferable that the width in the radial direction of the inner labyrinth seal face 29 be larger in terms of sealing performance.

Furthermore, under the usage state, the dam portion 26 of the elastic material portion 21 projects beyond the outer end face 68b of the outer opening portion 68 to the outer periphery side and beyond the outer peripheral surface 68c facing the outer peripheral direction of the outer opening portion 68 to the outer periphery side. Therefore, even when foreign matter such as rainwater, muddy water or dust moves to the outside along the outer peripheral surface 68c of the outer opening portion 68 of the outer ring 61 under the usage state, the foreign matter collides against the inner surface 26a which is a surface facing the inside of the dam portion 26, thereby interrupting further movement of the foreign matter to the outside. As described above, the foreign matter is suppressed from intruding in the direction to the radial lip 23 along the outer peripheral surface 68c of the outer opening portion 68 of the outer ring 61.

Under the usage state, the tip portion of the side lip 22 is in contact with the surface of the slinger 30 at the portion corresponding to the above-described predetermined interference, for example, the outer peripheral surface 33a which is a surface on the outer periphery side of the transition portion 33 so that the slinger 30 is slidable, and also the tip portion of the radial lip 23 is in contact with the surface of the slinger 30 at the portion corresponding to the above-described predetermined interference, for example, the outer peripheral surface 31b which is a surface on the outer periphery side of the fitting portion 31 so that the slinger 30 is slidable. The intrusion of foreign matter into the through-hole 67 is prevented by the side lip 22, and the flow-out of the lubricant from the through-hole 67 is prevented by the radial lip 23. Furthermore, under the usage state, the outer end 24a of the outer peripheral annular projection 24 faces the inner surface 32a of the flange portion 32 of the slinger 30 with a minute gap being kept in the axis x direction therebetween, and the outer peripheral annular projection 24 does not contact the slinger 30. As described above, the outer peripheral annular projection 24 forms a minute space between the outer peripheral annular projection 24 and the slinger 30, and does not contact the slinger 30, thereby enabling suppression of the intrusion of foreign matter in the direction to the side lip 22 while avoiding the increase of the sliding resistance of the slinger 30. Furthermore, as described above, the outer peripheral annular projection 24 obliquely extends to the outer periphery side, and foreign matter can be accumulated on the outer peripheral surface 24b which is the peripheral surface on the outer periphery side of the outer peripheral annular projection 24, so that intrusion of foreign matter passing along the outer peripheral surface 24b to the side lip 22 side can be prevented. Since the outer peripheral annular projection 24 is annular, foreign matter accumulated on the outer peripheral surface 24b falls along the outer peripheral surface 24b, so that the foreign matter can be discharged to the outside of the hub bearing 60.

As shown in FIG. 3, a step 65e is formed on the inner surface 65d of the wheel mounting flange 65b of the hub ring 65, and when a portion on the outer periphery side of the inner surface 65d is more recessed to the outside than a portion on the inner periphery side of the inner surface 65d, it is preferable that the flange portion 32 of the slinger 30 extend beyond the step 65e to the outer periphery side. This is because as shown in FIG. 3, on the outer periphery side of the step 65e, an annular space which is recessed in the inner peripheral direction can be formed between the flange portion 32 of the slinger 30 and the wheel mounting flange 65b, and foreign matter intruding from the outside of the hub bearing 60 can be accumulated in this space. Furthermore, foreign matter accumulated in the space between the slinger 30 and the wheel mounting flange 65b can be discharged to the outside of the hub bearing 60 by centrifugal force when the hub ring 65 is rotated. Therefore, it is possible to prevent foreign matter from intruding into the space between the sealing apparatus main body 10 and the slinger 30.

As described above, according to the sealing apparatus 1 according to the first embodiment of the present disclosure, the sealing performance with respect to foreign matter can be enhanced while avoiding the increase of the sliding resistance between the sealing apparatus 1 and the hub bearing 60.

Furthermore, according to the sealing apparatus 1, since the side lip 22 and the radial lip 23 of the sealing apparatus main body 10 can be prevented from being exposed to foreign matter intruding from the outside, the radial lip 23 biting foreign matter at the tip portion thereof to be damaged or deteriorated can be suppressed, and the sealing performance of the sealing apparatus main body 10 is deteriorated, with the result that that the lubricant leaks. Furthermore, damage or deterioration of the side lip 22 and the radial lip 23 due to biting of foreign matter can be reduced, and foreign matter intruding from the outside of the hub bearing 60 into the inside of the hub bearing 60.

Furthermore, when the slinger 30 is formed of stainless steel, the slinger 30 can be made less rusty. As a result, even when the slinger 30 is exposed to muddy water or salt water, occurrence of rust in the slinger 30 can be suppressed, occurrence of rust on the sliding surfaces of the side lip 22 and the radial lip 23 can be prevented, the side lip 22 and the radial lip 23 cannot contact the slinger 30 in a desired posture, and the side lip 22 and the radial lip 23 are damaged by rust, so that the sealing performance of the side lip 22 and the radial lip 23 deteriorates.

In the sealing apparatus 1, it is preferable that the value of the gap g1 forming the labyrinth seal s1 be set in consideration of an eccentric motion of the hub 62, variation in shape of each part, and the like. That is, it is preferable that the value of the gap g1 be set so that the flange portion 32 and the inner labyrinth seal face 29 do not contact each other even when the flange portion 32 or the inner labyrinth seal face 29 of the slinger 30 is tilted due to the eccentric motion of the hub 62 or the variation in shape of each member. Likewise, it is preferable that the value of the gap between the outer peripheral annular projection 24 and the flange portion 32 of the slinger 30 is also set so that the outer peripheral annular projection 24 and the flange portion 32 do not contact each other even when the flange portion 32 of the slinger 30 or the sealing apparatus main body 10 is tilted due to the eccentric motion of the hub 62 or the variation in shape of each member.

Figure 4:
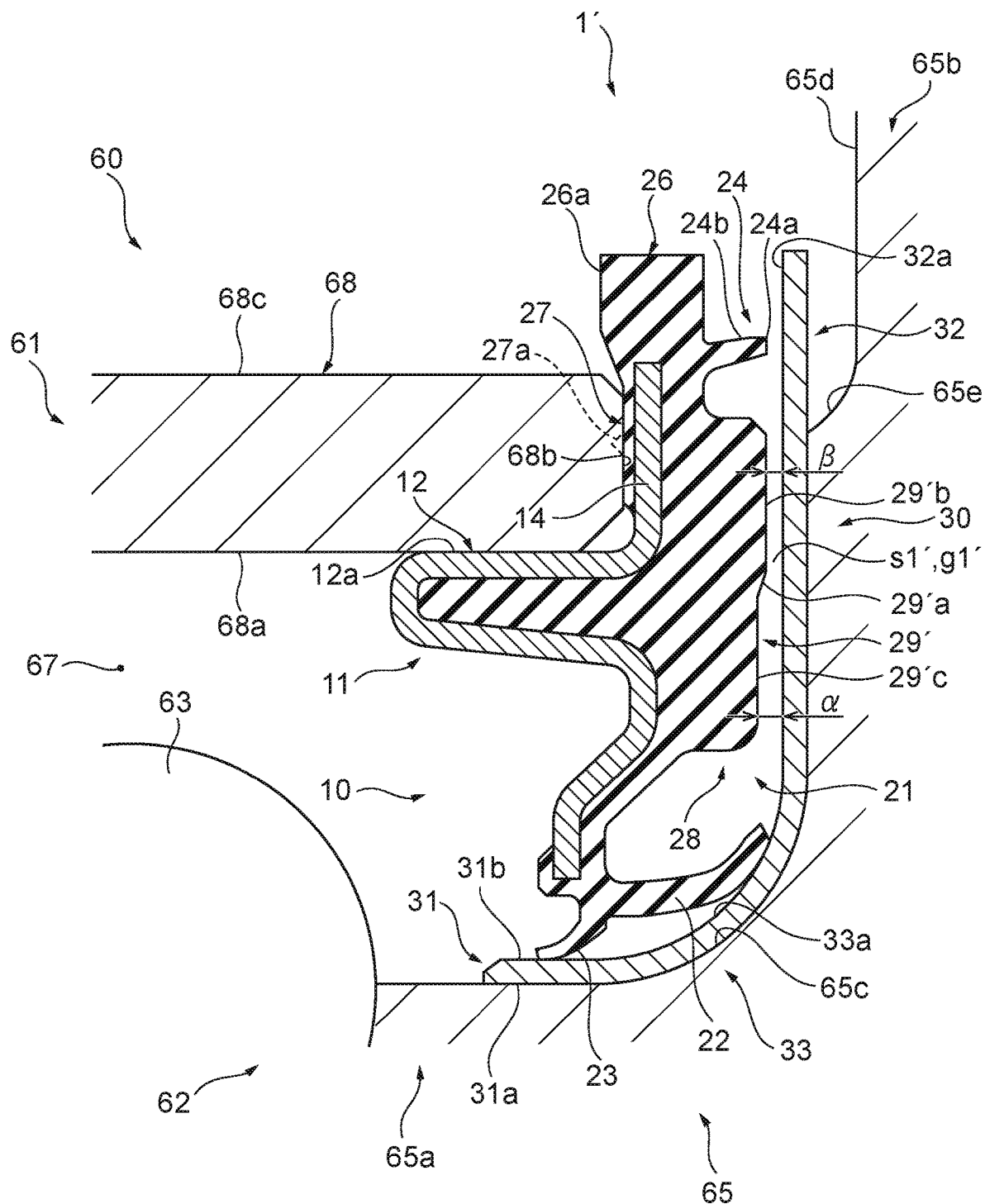
FIG. 4 is a partially enlarged cross-sectional view of a sealing apparatus in a usage state to show a schematic configuration of a sealing apparatus according to a variant of the first embodiment of the present disclosure.

Next, a variant of the sealing apparatus 1 according to the first embodiment of the present disclosure will be described. FIG. 4 is a partially enlarged cross-sectional view of a sealing apparatus 1' in use that shows a schematic configuration of the sealing apparatus 1' according to a variant of the first embodiment of the present disclosure. The sealing apparatus 1' according to the present variant differs from the above-described sealing apparatus 1 in the form of the inner labyrinth seal face 29 of the elastic material portion ridge portion 28. Hereinafter, components having the same or similar functions as or to those of the above-described sealing apparatus 1, will be represented by the same reference signs the description thereof will be omitted, and only different configurations will be described.

As shown in FIG. 4, in the sealing apparatus 1' according to the present variant, the elastic material portion ridge portion 28 of the sealing apparatus main body 10 faces the inner surface 32a of the flange portion 32 of the slinger 30 in the axis x direction, and has an inner labyrinth seal face 29' which forms an annular gap g1' between the inner labyrinth seal face 29' and the inner surface 32a of the flange portion 32. The width of the gap g1' in the axis x direction is narrow, and the inner labyrinth seal face 29' forms a labyrinth seal s1' between the inner labyrinth seal face 29' and the flange portion 32 by the gap g1' as in the case of the inner labyrinth seal face 29 of the sealing apparatus 1 described above. As shown in FIG. 4, the inner labyrinth seal face 29' is not a uniform flat surface, but has a step portion 29'a forming an annular step, and an outer periphery side surface 29'b which is a disc-like or substantially disc-like flat surface as a portion on the outer periphery side is located on the outside of an inner periphery side surface 29'c in the axis x direction which is a disc-like or substantially disc-like flat surface as a portion spreading to the inner periphery side of the outer periphery side surface 29'b. That is, the width of the gap g1' in the axis x direction is equal to a width α at the inner periphery side surface 29'c, and also is equal to a width β smaller than the width α at the outer periphery side surface 29'b.

As described above, in the sealing apparatus 1', the labyrinth seal s1' is also formed between the inner labyrinth seal face 29' and the flange portion 32 of the slinger 30, and the same effect as that obtained by using the sealing apparatus 1 described above can be obtained. Furthermore, with respect to the gap g1' forming the labyrinth seal s1', the width β on the outer periphery side is smaller than the width α of the inner periphery side, and this makes it difficult for foreign matter to intrude to the inner peripheral side beyond the labyrinth seal s1' and also makes it easy for foreign matter intruding to the inner periphery side beyond the labyrinth seal s1' to be discharged to the outer periphery side beyond the labyrinth seal s1'.

The inner labyrinth seal face 29' may have plural steps similar to the step portion 29'a. In this case, the gap g1' has three or more different widths. Furthermore, in the inner labyrinth seal face 29', the outer periphery side surface 29'b and the inner periphery side surface 29'c may not be flat surfaces, but may be substantially flat surfaces, surfaces having distortion, or curved surfaces in an area where the labyrinth seal s1' is formed.

Furthermore, in the sealing apparatus 1' according to the present variant, in order to form the gap g1' having the width α on the inner periphery side and the width β on the outer periphery side, the inner labyrinth seal face 29 is not deformed, but an annular step similar to that of the step portion 29'a of the inner labyrinth seal face 29' is formed on the inner surface 32a of the flange portion 32 of the slinger 30, thereby forming two annular surfaces forming a step similar to that of the outer periphery side surface 29'b and the inner periphery side surface 29'c.

In the sealing apparatus 1', it is preferable that the value of the gap g1' forming the labyrinth seal s1' be set in consideration of the eccentric motion of the hub 62, the variation of the shape of each part, and the like. That is, it is preferable to set the value of the gap g1' such that the flange portion 32 and the inner labyrinth seal face 29' do not contact each other even when the flange portion 32 of the slinger 30 or the inner labyrinth seal face 29' is tilted due to the eccentric motion of the hub 62 and the variation of the shape of each member.

Next, a sealing apparatus 2 according to a second embodiment of the present disclosure will be described. The sealing apparatus 2 according to the second embodiment of the present disclosure differs from the sealing apparatus 1 according to the first embodiment of the present disclosure described above in that the sealing apparatus 2 has a sealing apparatus main body 40 including an elastic material portion 21 having a different form from that of elastic material portion 21 of the sealing apparatus main body 10, and also has a slinger 50 having a different form from that of the slinger 30. Hereinafter, with respect to components having the same or similar functions as or to those of the sealing apparatus 1 according to the first embodiment of the present disclosure described above, they are represented by the same reference signs and the description thereof will be omitted, and different configurations will be described.

Figure 5:
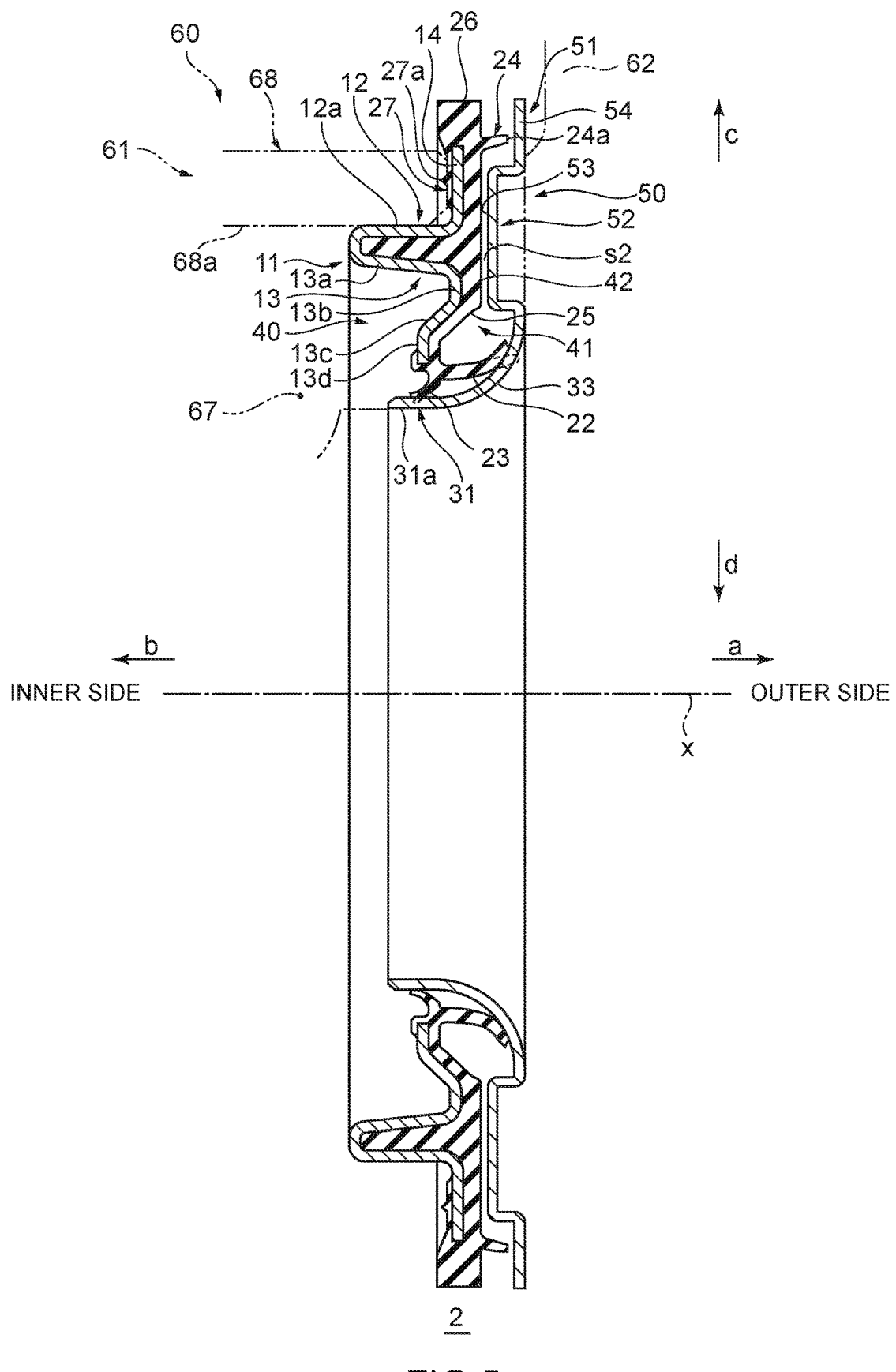
FIG. 5 is a cross-sectional view in a cross-section taken along the axis x to show a schematic configuration of a sealing apparatus according to a second embodiment of the present disclosure.

FIG. 5 is a cross-sectional view on a cross-section taken along the axis x to show a schematic configuration of the sealing apparatus 2 according to the second embodiment of the present disclosure. As shown in FIG. 5, in the sealing apparatus 2, the sealing apparatus main body 40 includes a reinforcing ring 11, and an elastic material portion 41 which is integrally attached to the reinforcing ring 11 like the above-described elastic material portion 21. As shown in FIG. 5, the elastic material portion 41 is different from the elastic material portion 21 in that the elastic material portion ridge portion 28 projecting to the outside is not formed on the base portion 25. As shown in FIG. 5, the slinger 50 as an opposing portion has a flange portion 51 which is different in shape from the flange portion 32 of the above-described slinger 30. The flange portion 51 of the slinger 50 forms a flange surface. The slinger 50 has a slinger ridge portion 52 as an opposing portion ridge portion which is an inwardly-projecting portion having an annular shape around the axis x in the flange portion 51, and the slinger ridge portion 52 has an outer labyrinth seal face 53 which is an annular surface facing the inside. The outer labyrinth seal face 53 is formed so as to face the elastic material portion 41 of the sealing apparatus main body 40 in the axis x direction, and the outer labyrinth seal face 53 and the elastic material portion 41 of the sealing apparatus main body 40 form the labyrinth seal s2.

Specifically, as shown in FIG. 5, the elastic material portion 41 of the sealing apparatus main body 40 has an inner labyrinth seal face 42 which is formed on the base portion 25 on the inner periphery side of the outer peripheral annular projection 24 and is an annular surface facing the outside. The inner labyrinth seal face 42 is an annular flat surface that spreads so as to face the outer labyrinth seal face 53 of the slinger ridge portion 52 of the slinger 50, and spreads on a plane perpendicular or substantially perpendicular to the axis x. Furthermore, the inner labyrinth seal face 42 is positioned on the inside of the outer peripheral annular projection 24 in the axis x direction, and the outer peripheral annular projection 24 protrudes to the outside beyond the inner labyrinth seal face 42. The inner labyrinth seal face 42 may not be a flat surface, but may be a substantially flat surface, a surface having distortion, or a curved surface in an area where the labyrinth seal s2 is formed. The width in the radial direction of the inner labyrinth seal face 42 is equal to or substantially equal to the width in the radial direction of the outer labyrinth seal face 53.

Specifically, in the slinger 50, a portion of the flange portion 51 which faces the inner labyrinth seal face 42 in the axis x direction protrudes to the inside, whereby the slinger ridge portion 52 is formed, and on the outer periphery side of the slinger ridge portion 52, the flange portion 51 has a disc portion 54 which is a portion expanding in a hollow disc-like shape or hollow substantially disc-like shape like the flange portion 32 of the slinger 30 shown in FIG. 3.

The outer labyrinth seal face 53 facing the inside of the slinger ridge portion 52 is formed so as to face the inner labyrinth seal face 42 of the elastic material portion 41 in the axis x direction, and, when in use, the inner labyrinth seal face 42 and the outer labyrinth seal face 53 form the labyrinth seal s2. The details of the labyrinth seal s2 will be described later. The outer labyrinth seal face 53 is a flat surface, and spreads on a plane orthogonal or substantially orthogonal to the axis x. The outer labyrinth seal face 53 may not be a flat surface, but may be a substantially flat surface, a surface having distortion, or a curved surface in an area where it forms the labyrinth seal s2.

Figure 6:
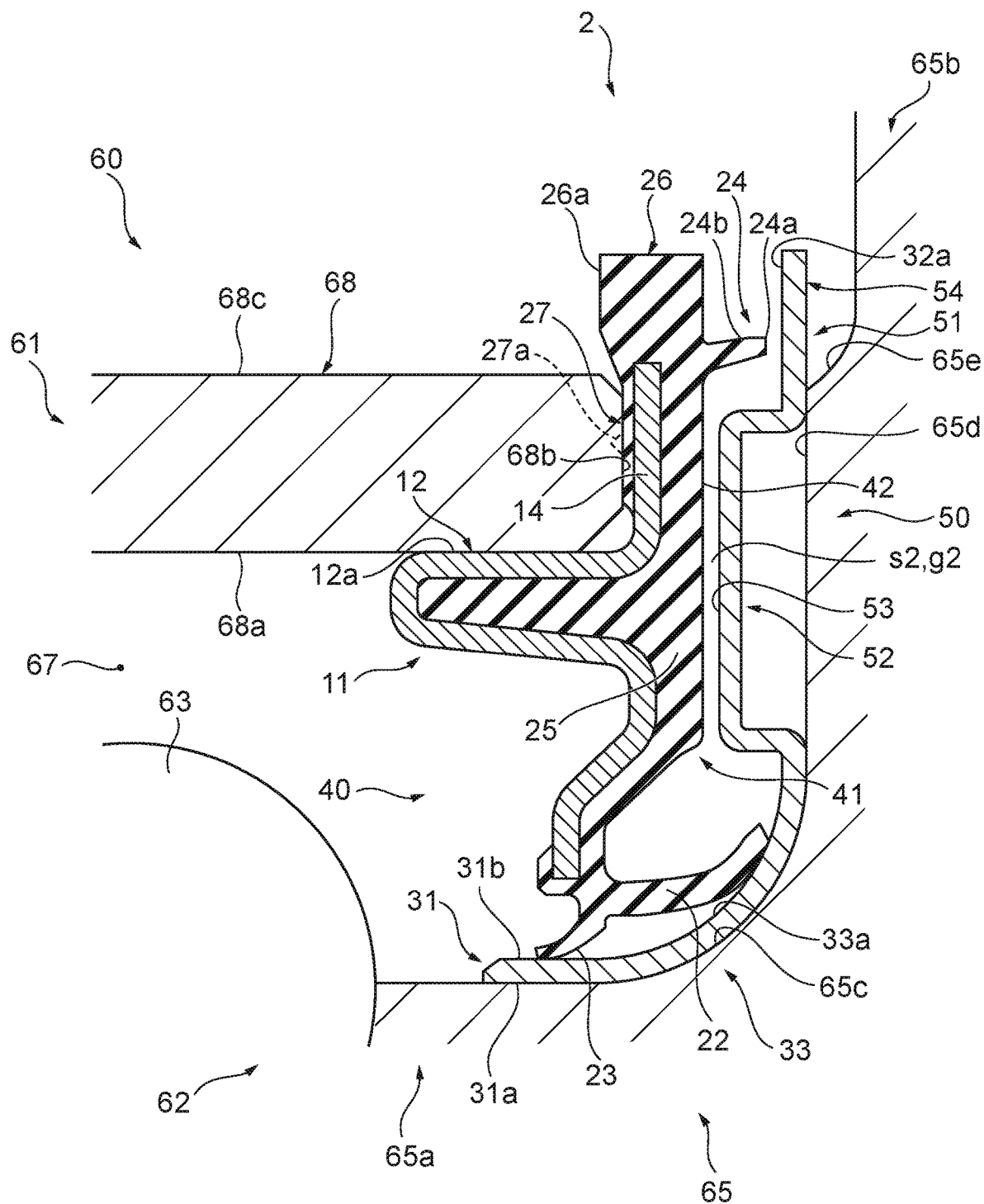
FIG. 6 is a partially enlarged cross-sectional view of the vicinity of the sealing apparatus in a cross-section taken along the axis x of the hub bearing to show the sealing apparatus shown in FIG. 5 in the usage state which is attached to a hub bearing.

Next, the usage state of the sealing apparatus 2 will be described. FIG. 6 is a partially enlarged cross-sectional view of the vicinity of the sealing apparatus 2 on a cross-section taken along the axis x of the hub bearing 60 to show the sealing apparatus 2 under the usage state which is attached to the hub bearing 60. As shown in FIG. 6, the sealing apparatus 2 is attached to the hub bearing 60 like the sealing apparatus 1. When in use, the flange portion 51 of the slinger 50 is in contact with the inner surface 65d of the wheel mounting flange 65b of the hub ring 65 at the disc portion 54.

As shown in FIG. 6, when in use, the outer labyrinth seal face 53 equipped to the slinger ridge portion 52 of the flange portion 51 of the slinger 50 faces the inner labyrinth seal face 42 of the elastic material portion 41 in the axis x direction, and forms an annular gap g2 between the outer labyrinth seal face 53 and the inner labyrinth seal face 42 of the elastic material portion 41. The width in the axis x direction of the gap g2 is small, and the gap g2 forms the labyrinth seal s2. Therefore, even when foreign matter intrudes from the outside of the hub bearing 60, the intruding foreign matter is prevented from further intruding to the side lip 22 side by the labyrinth seal s2 (gap g2) formed by the outer labyrinth seal face 53 of the slinger ridge portion 52 and the inner labyrinth seal face 42 of the elastic material portion 41. As described above, since the slinger ridge portion 52 forms the labyrinth seal s2 between the slinger 50 and the elastic material portion 41 without contacting the elastic material portion 41, the sealing performance to foreign matter can be enhanced while avoiding an increase in sliding resistance to the slinger 50 of the sealing apparatus main body 40. The increase of the sliding resistance of the sealing apparatus main body 40 to the slinger 50 can be avoided, so that increase of the sliding resistance to the hub bearing 60 can be avoided.

Furthermore, since the outer labyrinth seal face 53 extends between the side lip 22 of the elastic material portion 41 and the outer peripheral annular projection 24 in the radial direction and can have a large width in the radial direction, the width in the radial direction of the labyrinth seal s2 can be increased, and the sealing performance of the labyrinth seal s2 can be enhanced. It is preferable that the width in the radial direction of the outer labyrinth seal face 53 be as wide as possible in terms of sealing performance.

As shown in FIG. 6, a step 65e is formed on the inner surface 65d of the wheel mounting flange 65b of the hub ring 65, and when a portion on the outer periphery side is more recessed to the outside than a portion on the inner periphery side on the inner surface 65d, it is preferable that the disc portion 54 of the flange portion 51 of the slinger 50 extends beyond the step 65e to the outer periphery side. This is because an annular space recessed in the inner peripheral direction can be formed between the disc portion 54 of the slinger 50 and the wheel mounting flange 65b as in the case of the slinger 30 shown in FIG. 3, and foreign matter intruding from the outside of the hub bearing 60 can be accumulated in this space.

As described above, according to the sealing apparatus 2 according to the second embodiment of the present disclosure, it is possible to enhance the sealing performance to foreign matter while avoiding the increase of the sliding resistance between the sealing apparatus 2 and the hub bearing 60.

In the sealing apparatus 2, it is preferable that the value of the gap g2 forming the labyrinth seal s2 be set in consideration of the eccentric motion of the hub 62, the variation in shape of each part, and the like. That is, it is preferable to set the value of the gap g2 so that the flange portion 51 and the inner labyrinth seal face 42 do not contact each other even when the flange portion 51 of the slinger 50 or the inner labyrinth seal face 42 is tilted due to the eccentric motion of the hub 62 and the variation in shape of each member. Likewise, it is preferable to set the value of the gap between the outer peripheral annular projection 24 and the flange portion 51 of the slinger 50 so that the outer peripheral annular projection 24 and the flange portion 51 do not contact each other even when the flange portion 51 of the slinger 50 or the sealing apparatus main body 40 is tilted due to the eccentric motion of the hub 62 or the variation in shape of each member.

Figure 7:
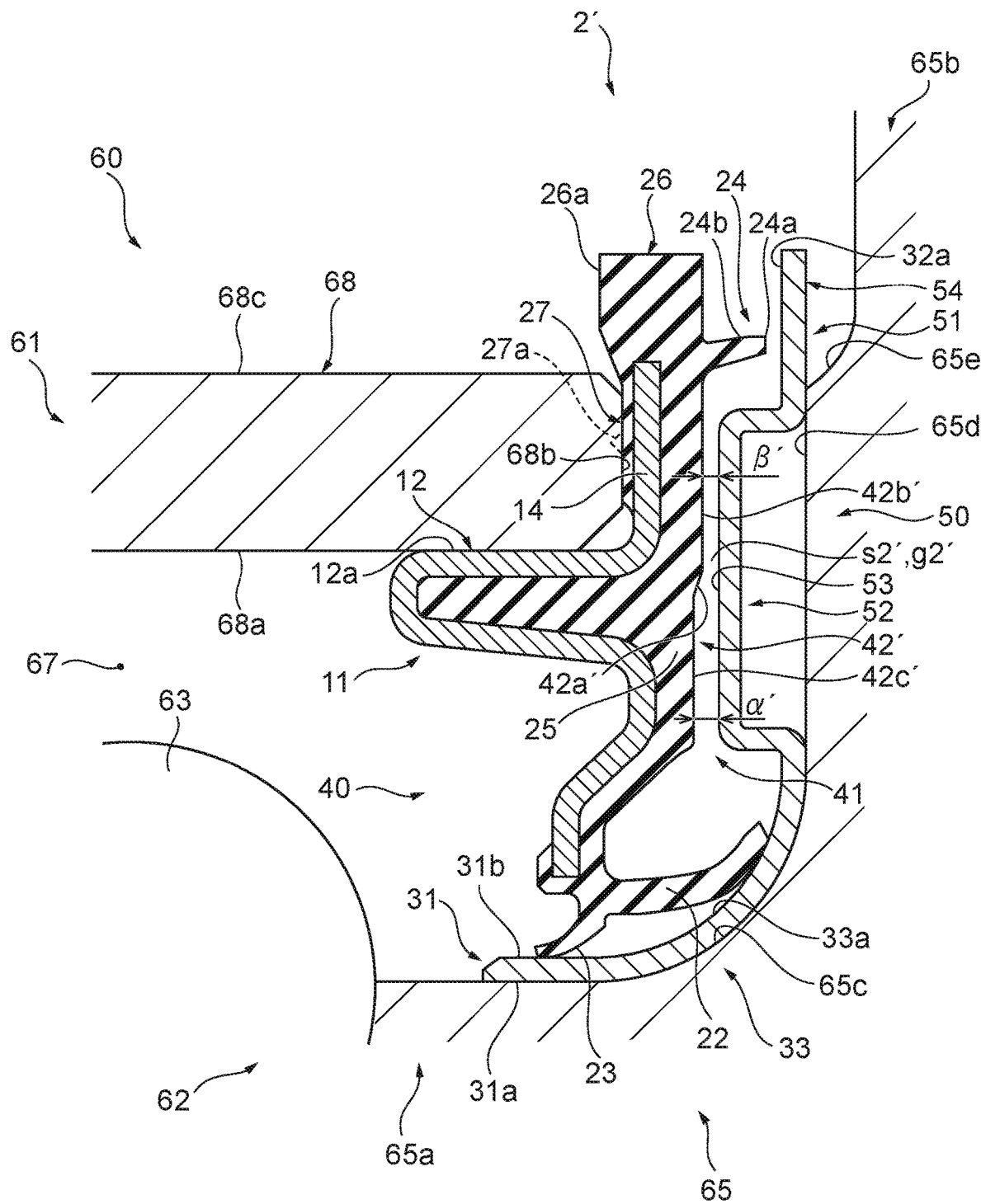
FIG. 7 is a partially enlarged cross-sectional view of a sealing apparatus in a usage state to show a schematic configuration of a sealing apparatus according to a variant of the second embodiment of the present disclosure.

Next, a variant of the sealing apparatus 2 according to the second embodiment of the present disclosure described above will be described. FIG. 7 is a partially enlarged cross-sectional view of a sealing apparatus 2' under a usage state to show a schematic configuration of the sealing apparatus 2' according to the variant of the second embodiment of the present disclosure. The sealing apparatus 2' according to the present variant differs from the foregoing sealing apparatus 2 in the form of the inner labyrinth seal face 42. Hereinafter, with respect to components having the same or similar functions as or to those of the above-described sealing apparatus 2, they are represented by the same reference signs, the description thereof will be omitted, and only different configurations will be described.

As shown in FIG. 7, in the sealing apparatus 2' according to the present variant, the base portion 25 of the sealing apparatus main body 40 includes an inner labyrinth seal face 42' which faces the outer labyrinth seal face 53 of the flange portion 51 of the slinger 50 in the axis x direction, and forms an annular gap g2' between the inner labyrinth seal face 42' and the outer labyrinth seal face 53. The width in the axis x direction of the gap g2' is narrow, and the inner labyrinth seal face 42' forms a labyrinth seal s2' between the inner labyrinth seal face 42' and the outer labyrinth seal face 53 by the gap g2' as in the case of the inner labyrinth seal face 42 of the sealing apparatus 2 described above. As shown in FIG. 7, the inner labyrinth seal face 42' has not a uniform flat surface, but a step portion 42'a forming an annular step, and an outer periphery side surface 42'b which is a disc-like or substantially disc-like flat surface as a portion on the outer periphery side is positioned on the outside in the axis x direction of an inner periphery side surface 42'c which is a disc-like or substantially disc-like flat surface as a portion that spreads more to the inner periphery side than the outer periphery side surface 42'b. That is, the width in the axis x direction of the gap g2' is equal to a width α' at the inner periphery side surface 42'c, and also equal to a width β' smaller than the width α' at the outer periphery side surface 42'b.

As described above, in the sealing apparatus 2', the labyrinth seal s2' is formed between the inner labyrinth seal face 42' and the outer labyrinth seal face 53 of the slinger ridge portion 52 of the slinger 50, and the same effect as the sealing apparatus 2 described above can be achieved. Furthermore, with respect to the gap g2' forming the labyrinth seal s2', the width β' thereof on the outer periphery side is smaller than the width α' thereof on the inner periphery side, and this makes it difficult for foreign matter to intrude to the inner periphery side beyond the labyrinth seal s2', and makes it easy for foreign matter intruding to the inner periphery side to be discharged beyond the labyrinth seal s2' to the outer periphery side.

It is to be noted that the inner labyrinth seal face 42' may have plural steps similar to the step of the step portion 42'a. In this case, the gap g2' has three or more different widths. Furthermore, on the inner labyrinth seal face 42', the outer periphery side surface 42'b and the inner periphery side surface 42'c may not be flat surfaces, but may be substantially flat surfaces, surfaces having distortion or curved surfaces in an area where the labyrinth seal s2' is formed.

Furthermore, in the sealing apparatus 2' according to the present variant, in order to form the gap g2' having the width α' on the inner periphery side and the width β' on the outer periphery side, the inner labyrinth seal face 42 may not be deformed, but an annular step similar to the step 42'a of the inner labyrinth seal face 42' may be formed on the outer labyrinth seal face 53 of the slinger ridge portion 52, thereby forming two annular surfaces forming the same step as the outer periphery side surface 42'b and the inner periphery side surface 42'c.

In the sealing apparatus 2', it is preferable that the value of the gap g2' forming the labyrinth seal s2' be set in consideration of the eccentric motion of the hub 62, the variation in shape of each portion, and the like. That is, it is preferable that the value of the gap g2' be set so that the flange portion 51 and the labyrinth seal face 42' do not contact each other even when the flange portion 51 of the slinger 50 and the inner labyrinth seal face 42' are tilted due to the eccentric motion of the hub 62 and the variation in shape of each member.

Next, a sealing apparatus 3 according to a third embodiment of the present disclosure will be described. The sealing apparatus 3 according to the third embodiment of the present disclosure differs from the sealing apparatus 1 according to the first embodiment of the present disclosure described above in the form of the opposing portion forming the labyrinth seal with the elastic material portion 21 of the sealing apparatus main body 10. The sealing apparatus 3 according to the third embodiment of the present disclosure does not have any slinger, and the opposing portion is formed in the hub 62. With respect to components having the same or similar functions as or to those of the sealing apparatus 1 according to the first embodiment of the present disclosure, they are represented by the same reference signs and the description thereof will be omitted, and different configurations will be described.

Figure 8:
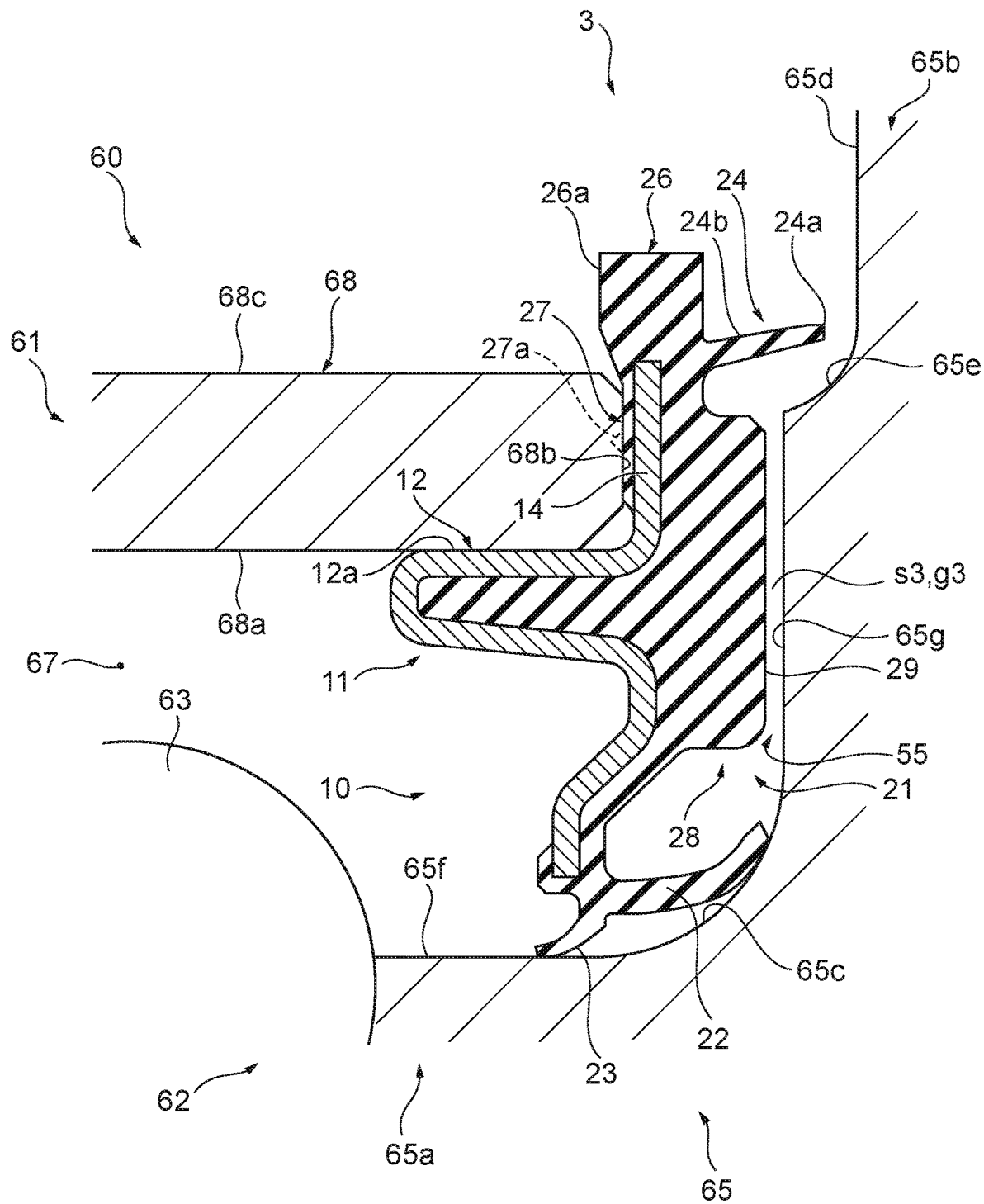
FIG. 8 a partially enlarged cross-sectional view of the vicinity of a sealing apparatus in a cross-section taken along the axis of the hub bearing in a usage state where a sealing structure is attached to the hub bearing to show a schematic configuration of a sealing apparatus according to a third embodiment of the present disclosure.

FIG. 8 is a partially enlarged cross-sectional view of the vicinity of the sealing apparatus 3 on a cross-section taken along the axis x of the hub bearing 60 shown under a usage state where the sealing apparatus 3 is attached to the hub bearing 60 in order to show a schematic configuration of the sealing apparatus 3 according to the third embodiment of the present disclosure. As shown in FIG. 8, in the sealing apparatus 3, the opposing portion is formed in the hub ring 65 of the hub 62. Specifically, an inner surface of the hub ring 65 which faces the sealing apparatus main body 10 forms the opposing portion 55. That is, in the hub ring 65, an outer peripheral surface 65f which is a peripheral surface of the shaft portion 65a, the transition portion 65c, a flange surface 65g spreading between the transition portion 65c and the step 65e, the step 65e, and the inner surface 65d form the opposing portion 55. The flange surface 65g is a flat surface which expands in a hollow disc-like shape around the axis x and spreads on a plane perpendicular or substantially perpendicular to the axis x. As shown in FIG. 8, the flange surface 65g faces the inner labyrinth seal face 29 of the elastic material portion ridge portion 28 in the axis x direction, and forms an annular gap g3 between the flange surface 65g and the inner labyrinth seal face 29. The width in the axis x direction of the gap g3 is small, and the gap g3 forms a labyrinth seal s3. The flange surface 65g may not be a flat surface, but may be a substantially flat surface, a surface having distortion, or a curved surface in an area where it forms the labyrinth seal s3. The width in the radial direction of the flange surface 65g is equal or substantially equal to the width in the radial direction of the inner labyrinth seal face 29.

Furthermore, when in use, the tip portion of the side lip 22 is in contact with the surface of the opposing portion 55 at the portion corresponding to the foregoing predetermined interference, for example, the transition portion 65c of the hub ring 65 so that the hub ring 65 is slidable, and also the tip portion of the radial lip 23 is in contact with the surface of the opposing portion 55 at the portion corresponding to the foregoing predetermined interference, for example, the outer peripheral surface 65f of the shaft portion 65a of the hub ring 65 so that the hub ring 65 is slidable. Furthermore, the outer end 24a of the outer peripheral annular projection 24 faces the opposing portion 55 with a minute gap being kept in the direction of the axis x therebetween, and does not contact the opposing portion 55. Specifically, the outer peripheral annular projection 24 faces the inner surface 65d of the wheel mounting flange 65b of the hub ring 65 with a minute gap being kept in the axis x direction therebetween.

As described above, under the usage state, the gap g3 between the flange surface 65g of the opposing portion 55 formed in the hub ring 65 and the inner labyrinth seal face 29 of the elastic material portion 21 forms the labyrinth seal s3. Therefore, even when foreign matter intrudes from the outside of the hub bearing 60, the intruding foreign matter is prevented from further intruding to the side lip 22 side by the labyrinth seal s3 (the gap g3). As described above, since the elastic material portion 21 and the opposing portion 55 form the labyrinth seal s3 without contacting each other, the sealing performance to foreign matter can be enhanced while avoiding increase of the sliding resistance of the sealing apparatus main body 10 to the hub 62. Since the increase of the sliding resistance of the sealing apparatus main body 10 to the hub 62 can be avoided, the increase of the sliding resistance against the hub bearing 60 can be avoided.

The flange surface 65g of the opposing portion 55 extends between the side lip 22 of the elastic material portion 21 and the outer peripheral annular projection 24 in the radial direction, and the width in the radial direction can be increased, so that the width in the radial direction of the labyrinth seal s3 can be increased, and the sealing performance of the labyrinth seal s3 can be enhanced. It is preferable that the width in the radial direction of the flange surface 65g of the opposing portion 55 be as large as possible in terms of sealing performance.

As described above, according to the sealing apparatus 3 according to the third embodiment of the present disclosure, the sealing performance to foreign matter can be enhanced while avoiding increase of the sliding resistance between the sealing apparatus 3 and the hub bearing 60.

In the sealing apparatus 3 according to the third embodiment of the present disclosure, the elastic material portion 21 may have, not an inner labyrinth seal face 29, but an inner labyrinth seal face 29' on which the step portion 29' shown in FIG. 4 is formed. In this case, as shown in FIG. 4, with respect to the gap forming the labyrinth seal between the elastic material portion ridge portion 28 and the flange surface 65g, the width of the gap in the axis x direction is equal to the width α on the inner periphery side, and is also equal to the width β smaller than the width α on the outer periphery side (see FIG. 4).

In the sealing apparatus 3, it is preferable that the value of the gap g3 forming the labyrinth seal s3 be set in consideration of the eccentric motion of the hub 62, the variation in shape of each part, and the like. That is, it is preferable that the value of the gap g3 be set so that the flange surface 65g and the inner labyrinth seal face 29 do not contact each other even when the hub ring 65 or the inner labyrinth seal face 29 is tilted due to the eccentric motion of the hub 62 or the variation in shape of each member. Likewise, it is preferable that the value of the gap between the outer peripheral annular projection 24 and the inner surface 65d of the hub ring 65 be set so that the outer peripheral annular projection 24 and the inner surface 65d of the hub ring 65 do not contact each other even when the hub ring 65 or the sealing apparatus main body 10 is tilted due to the eccentric motion of the hub 62 or the variation in shape of each member.

Next, a sealing apparatus 4 according to a fourth embodiment of the present disclosure will be described. The sealing apparatus 4 according to the fourth embodiment of the present disclosure differs from the sealing apparatus 2 according to the second embodiment of the present disclosure in the form of the opposing portion forming the labyrinth seal with the elastic material portion 41 of the sealing apparatus main body 40. The sealing apparatus 4 according to the fourth embodiment of the present disclosure does not have any slinger, and the opposing portion is formed in the hub 62. Hereinafter, with respect to components having the same or similar functions as or to those of the sealing apparatus 2 according to the second embodiment of the present disclosure, they are represented by the same reference signs and the description thereof will be omitted, and different configurations will be described.

Figure 9:
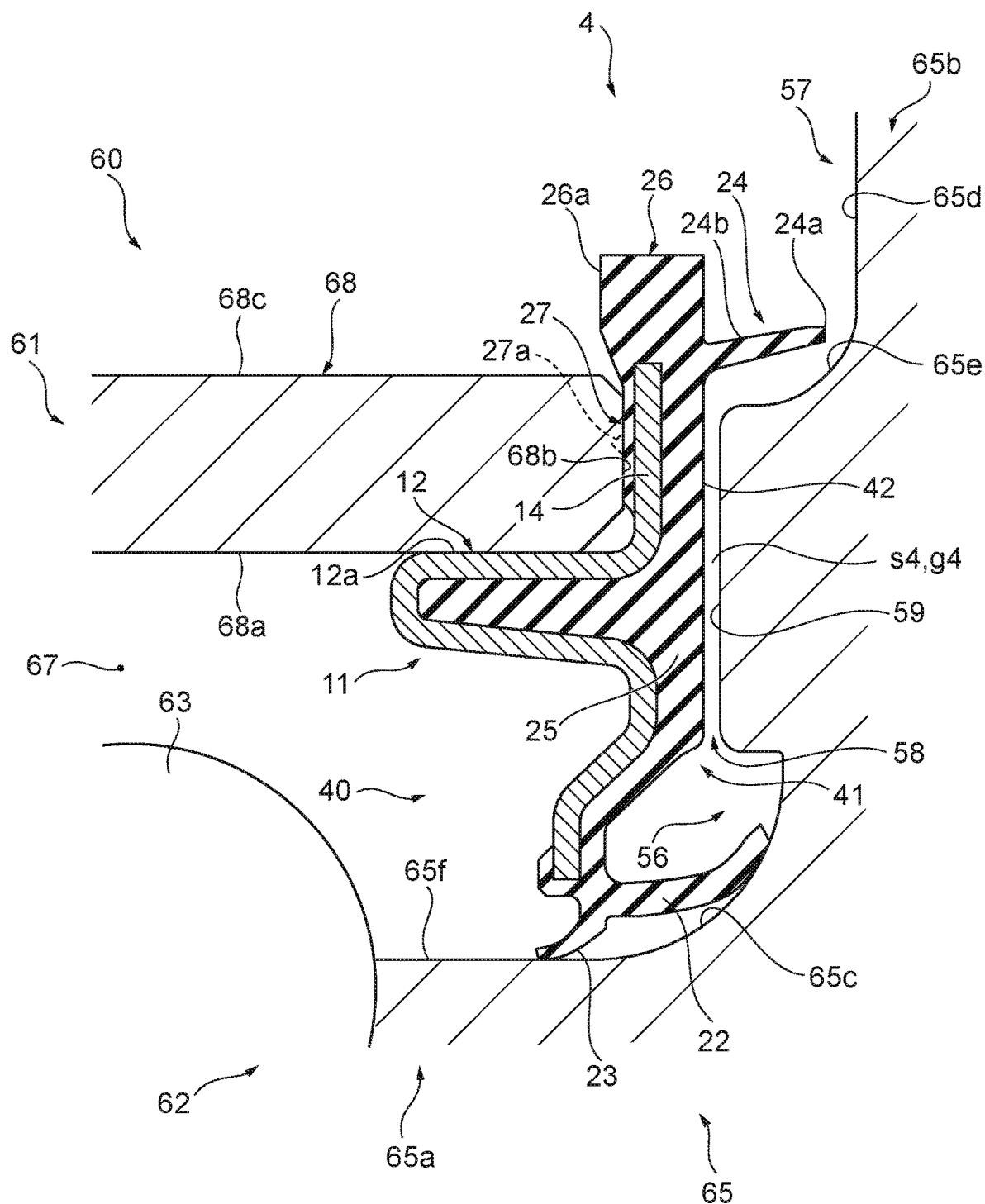
FIG. 9 is a partially enlarged cross-sectional view of the vicinity of a sealing apparatus in a cross-section taken along the axis of the hub bearing in a usage state where a sealing structure is attached to the hub bearing to show a schematic configuration of a sealing apparatus according to a fourth embodiment of the present disclosure.

FIG. 9 shows a partially enlarged cross-sectional view of the vicinity of the sealing apparatus 4 on a cross-section taken along the axis x of the hub bearing 60, which is shown under an usage state in which the sealing apparatus 4 is attached to the hub bearing 60 in order to show a schematic configuration of the sealing apparatus 4 according to the fourth embodiment of the present disclosure. As shown in FIG. 9, in the sealing apparatus 4, the opposing portion is formed in the hub ring 65 of the hub 62. Specifically, an inner surface of the hub ring 65 which faces the sealing apparatus main body 40 forms the opposing portion 56. That is, in the hub ring 65, the outer peripheral surface 65f which is the peripheral surface of the shaft portion 65a, the transition portion 65c, a surface spreading between the transition portion 65c and the step 65e, the step 65e, and the inner surface 65d form the opposing portion 56. In the opposing portion 56, a surface which is located inside the outer periphery side of the transition portion 65c is the flange surface 57. The flange surface 57 is an annular surface extending in the peripheral direction with respect to the axis x. In the opposing portion 56, the hub ring 65 has an opposing portion ridge portion 58 which is an annular portion around the axis line x protruding to the inside and positioned on the flange surface 57, more specifically, between the transition portion 65c and the step 65e, and the opposing portion ridge portion 58 has an outer labyrinth seal face 59 which is an annular surface facing the inside. The outer labyrinth seal face 59 is formed so as to face the elastic material portion 41 of the sealing apparatus main body 40 in the axis x direction.

Under the usage state, the outer labyrinth seal face 59 of the opposing portion ridge portion 58 formed in the hub ring 65 faces the inner labyrinth seal face 42 of the elastic material portion 41 in the axis x direction as shown in FIG. 9, and forms an annular gap g4 between the outer labyrinth seal face 59 and the inner labyrinth seal face 42. The width in the axis x direction of the gap g4 is small, and the gap g4 forms a labyrinth seal s4. The outer labyrinth seal face 59 may not be a flat surface, but may be a substantially flat surface, a surface having distortion, or a curved surface in an area where it forms the labyrinth seal s4. The width in the radial direction of the outer labyrinth seal face 59 is equal to or substantially equal to the width in the radial direction of the inner labyrinth seal face 42.

Furthermore, under the usage state, the tip portion of the side lip 22 is in contact with the surface of the opposing portion 56 at the portion corresponding to the above-mentioned predetermined interference, for example, the transition portion 65c of the hub ring 65 so that the hub ring 65 is slidable, and the tip portion of the radial lip 23 is in contact with the surface of the opposing portion 56 at the portion corresponding to the above-described predetermined interference, for example, the outer peripheral surface 65f of the shaft portion 65a of the hub ring 65 so that the hub ring 65 is slidable. Furthermore, the outer end 24a of the outer peripheral annular projection 24 faces the opposing portion 56 with a minute gap being kept in the axis x direction therebetween, and does not contact the opposing portion 56. Specifically, the outer peripheral annular projection 24 faces the inner surface 65d of the wheel mounting flange 65b of the hub ring 65 with a minute gap being kept in the axis x direction therebetween.

As described above, the gap g4 between the outer labyrinth seal face 59 of the opposing portion ridge portion 58 of the opposing portion 56 formed in the hub ring 65 and the inner labyrinth seal face 42 of the elastic material portion 41 forms the labyrinth seal s4 under the usage state. Therefore, even when foreign matter intrudes from the outside of the hub bearing 60, the foreign matter is prevented from further intruding to the side lip 22 side by the labyrinth seal s4 (the gap g4). As described above, since the elastic material portion 41 and the opposing portion 56 form the labyrinth seal s4 without contacting each other, the sealing performance to foreign matter can be enhanced while avoiding the increase of the sliding resistance of the sealing apparatus main body 40 to the hub 62. Since the increase of the sliding resistance of the sealing apparatus main body 40 to the hub 62 can be avoided, the increase of the sliding resistance to the hub bearing 60 can be avoided.

The outer labyrinth seal face 59 of the opposing portion ridge portion 58 extends between the side lip 22 and the outer peripheral annular projection 24 of the elastic material portion 41 in the radial direction, and the width in the radial direction of the outer labyrinth seal face 59 can be increased, so that the width in the radial direction of the labyrinth seal s4 can be increased, and the sealing performance of the labyrinth seal s4 can be enhanced. It is preferable that the width in the radial direction of the outer labyrinth seal face 59 of the opposing portion ridge portion 58 is as large as possible in terms of the sealing performance.

As described above, according to the sealing apparatus 4 of the fourth embodiment of the present disclosure, the sealing performance to foreign matter can be enhanced while avoiding increase of the sliding resistance between the sealing apparatus 4 and the hub bearing 60.

In the sealing apparatus 4 according to the fourth embodiment of the present disclosure, the elastic material portion 41 may have, not the inner labyrinth seal face 41, but the inner labyrinth seal face 42' having the step portion 42a' shown in FIG. 7. In this case, as shown in FIG. 7, the gap forming the labyrinth seal between the outer labyrinth seal face 59 and the labyrinth seal face 42' has a width in the axis x direction which is equal to a width α' on the inner periphery side and also equal to a width β' smaller than the width α' on the outer periphery side (see FIG. 7).

In the sealing apparatus 4, it is preferable that the value of the gap g4 forming the labyrinth seal s4 be set in consideration of the eccentric motion of the hub 62, the variation in shape of each part, and the like. That is, it is preferable that the value of the gap g4 be set so that the outer labyrinth seal face 59 and the inner labyrinth seal face 42 do not contact each other even when the hub ring 65 or the inner labyrinth seal face 42 is tilted due to the eccentric motion of the hub 62 or the variation in shape of each member. Likewise, it is preferable that the value of the gap between the outer peripheral annular projection 24 and the inner surface 65d of the hub ring 65 be set so that the outer peripheral annular projection 24 and the inner surface 65d of the hub ring 65 do not contact each other even when the hub ring 65 or the sealing apparatus main body 40 is titled due to the eccentric motion of the hub 62 or the variation in shape of each member.

The embodiments of the present disclosure have been described above. However, the present disclosure is not limited to the foregoing embodiments of the present disclosure, but includes all aspects contained in the concepts of the present disclosure and the claims. Furthermore, the components may be appropriately selectively applied or combined with one another for at least part of the problems and effects described above. For example, the sealing apparatus according to the embodiments of the present disclosure may have either or both of the outer peripheral annular projection 24 and the dam portion 26. Furthermore, for example, a sealing apparatus including the sealing apparatus main body 10 of the sealing apparatus 1 and the slinger 50 of the sealing apparatus 2 is also included in the sealing apparatus according to the present disclosure. The shape, material, arrangement, size, etc. of each component in the above embodiment can be appropriately changed according to the specific use mode of the present disclosure.

It has been described that the sealing apparatus according to the present disclosure is applied to a hub bearing of a vehicle or the like, but the sealing apparatus is not limitedly applied to one used in this configuration. The sealing apparatus according to the present disclosure can be applied to any configuration having an outer periphery side member and an inner periphery side member which is at least partially enclosed by the outer periphery side member, the outer periphery side member and the inner periphery side member being rotatable relatively to each other with respect to an axis. For example, the present disclosure can be applied to all configurations that can utilize the effect of the present disclosure, such as industrial bearings, other vehicles, general purpose machines, and industrial machines. Apparatuses and structures to which the sealing apparatus according to the present disclosure is applied are ones in which the outer periphery side member, the inner periphery side member, or both of the outer periphery side member and the inner periphery side member rotate.

What is claimed is:

1. A sealing apparatus for sealing a space between an outer periphery side member and an inner periphery side member which is at least partially enclosed by the outer periphery side member, the outer periphery side member and the inner periphery side member being rotatable relative to each other with respect to an axis, the axis defining a first axial side and a second axial side of the sealing apparatus and components of the sealing apparatus, the sealing apparatus comprising:

a sealing apparatus main body attached to the outer periphery side member; and an opposing portion that is separate from and attached to the inner periphery side member, the opposing portion having an annular shape around the axis and being arranged on the first axial side of the sealing apparatus main body, wherein the sealing apparatus main body includes a reinforcing ring having an annular shape around the axis, and an elastic material portion having an annular shape around the axis which is attached to the reinforcing ring and formed of an elastic material, the elastic material portion includes an elastic main body, a side lip that contacts the opposing portion from the second axial side of the sealing apparatus, a radial lip that contacts the opposing portion from an outer periphery side of the sealing apparatus, an outer peripheral annular projection having an annular shape around the axis that is arranged on an outer periphery side of the side lip and protrudes from the elastic main body toward the first axial side of the sealing apparatus, and a ridge portion between the outer peripheral annular projection and the side lip, the ridge portion having an annular shape around the axis that projects from the elastic main body toward the first axial side of the sealing apparatus, the ridge portion projects axially from the elastic main body a first distance and has an inner labyrinth seal face that extends radially a second distance, the second distance being longer than the first distance, the outer peripheral annular projection forms a gap between a tip of the outer peripheral annular projection and the opposing portion, the gap being arranged on the first axial side of the outer peripheral annular projection, the opposing portion has an annular flange surface extending radially, and the flange surface of the opposing portion and the elastic material portion of the sealing apparatus main body form a labyrinth seal between the outer peripheral annular projection and the side lip.

2. The sealing apparatus according to claim 1, wherein the inner labyrinth seal face is formed so as to face the flange surface of the opposing portion via a gap in a direction of the axis, and the inner labyrinth seal face and the flange surface of the opposing portion form the labyrinth seal.

3. The sealing apparatus according to claim 2, wherein the inner labyrinth seal face has at least one annular step portion forming a step in the direction of the axis, such that a portion of the inner labyrinth seal face on an outer periphery side of the step is positioned closer to the first axial side of the sealing apparatus than a portion of the inner labyrinth seal face on an inner periphery side of the step.

4. The sealing apparatus according to claim 1, wherein the opposing portion has an opposing portion ridge portion on the flange surface, the opposing portion ridge portion being a portion having an annular shape around the axis which protrudes to the second axial side of the sealing apparatus, the opposing portion ridge portion has an outer labyrinth seal face which is an annular surface facing the second axial side of the sealing apparatus, the outer labyrinth seal face is formed so as to face the elastic material portion of the sealing apparatus main body via a gap in a direction of the axis, and the outer labyrinth sealing face and the elastic material portion of the sealing apparatus main body form the labyrinth seal.

5. The sealing apparatus according to claim 4, wherein the inner labyrinth seal face of the elastic material portion faces the outer labyrinth seal face and has at least one annular step portion forming a step such that a portion of the inner labyrinth seal face on an outer periphery side of the step is positioned closer to the first axial side of the seal apparatus than a portion of the of the inner labyrinth seal face on an inner periphery side of the step.

6. The sealing apparatus according to claim 1, wherein:
the opposing portion corresponds to a slinger,
the stinger has a fitting portion that extends along the axis in an annular shape around the axis, and
the slinger has an annular flange portion that extends from a first axial side end portion of the fitting portion to the outer periphery side of the sealing apparatus, the annular flange portion forming the flange surface of the opposing portion.

7. The sealing apparatus according to claim 1, wherein the elastic material portion has a dam portion being an annular portion which is located on an outer periphery side of the outer peripheral annular projection and protrudes to the outer periphery side, and the dam portion is formed so as to protrude to the outer periphery side beyond a portion of the outer periphery side member which contacts the sealing apparatus main body.

8. The sealing apparatus according to claim 1, wherein:
the opposing portion has a flange portion that defines the annular flange surface of the opposing portion, and
an annular space is formed between the flange portion and the inner periphery side member, the annular space being recessed radially toward the axis.

9. The sealing apparatus according to claim 1, wherein the outer peripheral annular projection extends oblique to the axis.

* * * * *